(12) United States Patent
Tanaka et al.

(10) Patent No.: US 7,408,859 B2
(45) Date of Patent: Aug. 5, 2008

(54) METHOD AND APPARATUS FOR RECORDING AND REPRODUCING INFORMATION ON AND FROM RECORDING DISC

(75) Inventors: Yoshiaki Tanaka, Fujisawa (JP); Isao Oowaki, Setagaya-ku (JP)

(73) Assignees: Victor Company of Japan Ltd., Yokohama (JP); Victor Entertainment, Inc., Tokyo (JP)

( * ) Notice: Subject to any disclaimer, the term of this patent is extended or adjusted under 35 U.S.C. 154(b) by 926 days.

(21) Appl. No.: 10/637,596

(22) Filed: Aug. 11, 2003

(65) Prior Publication Data

US 2004/0028230 A1    Feb. 12, 2004

Related U.S. Application Data

(62) Division of application No. 08/933,825, filed on Sep. 19, 1997, now Pat. No. 6,618,335.

(30) Foreign Application Priority Data

Sep. 25, 1996    (JP)    ................................. 8-274246

(51) Int. Cl.
*G11B 7/00*    (2006.01)
*H04N 7/167*    (2006.01)
(52) U.S. Cl. ..................... 369/53.21; 380/203
(58) Field of Classification Search .............. 380/202
See application file for complete search history.

(56) References Cited

U.S. PATENT DOCUMENTS

| 5,003,410 | A | 3/1991 | Endoh et al. |
| 5,057,947 | A | 10/1991 | Shimada |
| 5,519,681 | A | 5/1996 | Maeda et al. |
| 5,538,773 | A | 7/1996 | Kondo |
| 5,661,715 | A | 8/1997 | Blaukovitsch |

(Continued)

FOREIGN PATENT DOCUMENTS

| EP | 328141 | 8/1989 |
| EP | 407094 | 1/1991 |
| EP | 580367 | 12/1994 |
| JP | 02036475 | 2/1990 |
| JP | 05-159462 | 6/1993 |
| JP | 06-150568 | 5/1994 |
| JP | 07-021697 | 1/1995 |
| JP | 08-031080 | 2/1996 |
| JP | 08-212681 | 8/1996 |

OTHER PUBLICATIONS

"A Safer World For Replicators", Billboard, V. 108, N. 34, p. 41, Aug. 24, 1996.

(Continued)

*Primary Examiner*—Matthew B Smithers
(74) *Attorney, Agent, or Firm*—Connolly Bove Lodge & Hutz LLP

(57) ABSTRACT

A recording disc has a lead-in area and a data area. A scrambled version of a SID code word is read out from the lead-in area of the disc. The SID code word represents a producer of the disc. The readout scrambled version is descrambled to recover the SID code word. The recovered SID code word is collated with reference SID code words to decide whether or not the disc is legitimate. Main information is read out from the data area of the disc when it is decided that the disc is legitimate. Readout of the main information from the data area of the disc is inhibited when it is decided that the disc is not legitimate.

3 Claims, 21 Drawing Sheets

U.S. PATENT DOCUMENTS

| | | | |
|---|---|---|---|
| 5,671,205 | A | 9/1997 | Ledieu |
| 5,734,787 | A | 3/1998 | Yonemitsu et al. |
| 5,761,301 | A | 6/1998 | Oshima et al. |
| 5,807,640 | A | 9/1998 | Ueno et al. |
| 5,872,755 | A | 2/1999 | Inazawa et al. |
| 5,883,959 | A | 3/1999 | Kori |
| 5,889,868 | A | 3/1999 | Moskowitz et al. |
| 5,901,127 | A | 5/1999 | Sako et al. |
| 5,940,358 | A | 8/1999 | Kato |
| 6,005,839 | A | 12/1999 | Sako et al. |
| 6,052,465 | A | 4/2000 | Gotoh et al. |
| 6,618,335 | B2 * | 9/2003 | Tanaka et al. ............ 369/53.21 |

OTHER PUBLICATIONS

Boden, L., "CD-ROM priracy, and the emerging technology fix", Library and Information Science Abstracts, Sep. 1995, p. 68.

Frost, T., "A pressing problem", Personal Computer World 17, Aug. 1994, p. 497.

"Music Industry Unvells DVD Music Technical Recommendations", Audio Week, May 27, 1996.

"International Federation of Phonographic Industry (IFPI)", Audio Week, Jan. 1, 1996.

"Watchdog body promotes system to beat CD piracy", The Straits Times, Apr. 17, 1994, p. 24.

"Major plant tackles piracy", Pro Sound News Europe, V. 10, No. 10, p. 15, Oct. 1995.

"Fraud Finders", Music Week, p. 35, Aug. 27, 1994.

"Curbing worldwide CD piracy", Tape-Disc Business, V. 8, No. 9, p. 3(2), Sep. 1994.

* cited by examiner

FIG. 25

| COPY CONTROL DATA CGMCAPS CODE | ACTION ROM MEDIA | ACTION RAM MEDIA |
|---|---|---|
| (1, 1) | PREVENT | PREVENT |
| (1, 0) | PREVENT | PREVENT |
| (1, 0, 1) | PREVENT | ALLOW |
| (0, 0) | ALLOW | ALLOW |
| NO MARK DETECTABLE (INCLUDES SCRAMBLED DATA) | ALLOW | ALLOW |

METHOD AND APPARATUS FOR RECORDING AND REPRODUCING INFORMATION ON AND FROM RECORDING DISC

This application is a divisional of U.S. patent application, Ser No. 08/933,825, filed Sep. 19, 1997.

BACKGROUND OF THE INVENTION

1. Field of the Invention

This invention relates to a method and an apparatus for reproducing information from a recording disc such as a DVD (digital video disc), a CD (compact disc), or a CD-ROM (compact disc read only memory). Also, this invention relates to a method and an apparatus for recording information on a recording disc. Furthermore, this invention relates to a recording disc.

2. Description of the Related Art

According to a conceivable system (which is not prior art to this invention) for copyright protection regarding main information on a recording disc, copyright management information is scrambled, and the scrambled version of the copyright management information is recorded on a legitimate disc. Also, main information is recorded on the legitimate disc. The copyright management information is designed so that a portion thereof forms a playback permission key. Thus, a legitimate disc stores a playback permission key. On the other hand, an illegal copy disc or a pirated disc lacks a playback permission key.

A disc player according to the conceivable system is designed to start the reproduction of main information from a recording disc only when a playback permission key is successfully detected. Specifically, when a legitimate disc is placed in the disc player, the disc player reads out the scrambled version of copyright management information from the legitimate disc and de-scrambles it into the original copyright management information. The disc player detects a playback permission key in the copyright management information. Then, the disc player starts to reproduce main information from the legitimate disc in response to successful detection of the playback permission key.

When a pirated disc is placed in the disc player according to the conceivable system, the disc player read's out information corresponding to copyright management information and subjects it to a de-scrambling process. Since the pirated disc lacks copyright management information and the de-scrambling resultant information differs from the copyright management information, the disc player does not detect any playback permission key. Accordingly, the disc player will not start to reproduce main information from the pirated disc.

SUMMARY OF THE INVENTION

It is a first object of this invention to provide an improved method of reproducing information from a recording disc.

It is a second object of this invention to provide an improved apparatus for reproducing information from a recording disc.

It is a third object of this invention to provide an improved method of recording information on a recording disc.

It is a fourth object of this invention to provide an improved apparatus for recording information on a recording disc.

It is a fifth object of this invention to provide an improved recording disc.

A first aspect of this invention provides a method of reproducing information from a recording disc having a lead-in area and a data area, comprising the steps of reading out a scrambled version of a SID code word from the lead-in area of the disc, the SID code word representing a producer of the disc; de-scrambling the readout scrambled version to recover the SID code word; collate the recovered SID code word with reference SID code words to decide whether or not the disc is legitimate; reading out main information from the data area of the disc when it is decided that the disc is legitimate; and inhibiting readout of the main information from the data area of the disc when it is decided that the disc is not legitimate.

A second aspect of this invention is based on the first aspect thereof, and provides a method further comprising the steps of reading out a copy inhibition code word from the lead-in area of the disc; deciding whether or not the readout copy inhibition code word indicates copy inhibition; and inhibiting readout of the main information from the data area of the disc in cases where the readout copy inhibition code word indicates the copy inhibition even though it is decided that the disc is legitimate.

A third aspect of this invention provides a method of reproducing information from a recording disc having a post cutting area and a data area, comprising the steps of reading out a scrambled version of a SID code word from the post cutting area of the disc, the SID code word representing a producer of the disc; de-scrambling the readout scrambled version to recover the SID code word; collating the recovered SID code word with reference SID code words to decide whether or not the disc is legitimate; reading out main information from the data area of the disc when it is decided that the disc is legitimate; and inhibiting readout of the main information from the data area of the disc when it is decided that the disc is not legitimate.

A fourth aspect of this invention provides a method of reproducing information from a recording disc having a TOC area and a data area, comprising the steps of reading out a scrambled version of a SID code word from the TOC area of the disc, the SID code word representing a producer of the disc; de-scrambling the readout scrambled version to recover the SID code word; collating the recovered SID code word with reference SID code words to decide whether or not the disc is legitimate; reading out main information from the data area of the disc when it is decided that the disc is legitimate; and inhibiting readout of the main information from the data area of the disc when it is decided that the disc is not legitimate.

A fifth aspect of this invention provides an apparatus for reproducing information from a recording disc having a lead-in area and a data area, comprising first means for reading out a scrambled version of a SID code word from the lead-in area of the disc, the SID code word representing a producer of the disc; second means for de-scrambling the scrambled version read out by the first means to recover the SID code word; third means for collating the SID code word recovered by the second means with reference SID code words to decide whether or not the disc is legitimate; fourth means for reading out main information from the data area of the disc when the third means decides that the disc is legitimate; and fifth means for inhibiting readout of the main information from the data area of the disc when the third means decides that the disc is not legitimate.

A sixth aspect of this invention is based on the fifth aspect thereof, and provides an apparatus further comprising sixth means for reading out a copy inhibition code word from the lead-in area of the disc; seventh means for deciding whether or not the copy inhibition code word read out by the sixth means indicates copy inhibition; and eighth means for inhibiting readout of the main information from the data area of the disc in cases where the seventh means decides that the copy inhibition code word indicates the copy inhibition even though the third means decides that the disc is legitimate.

A seventh aspect of this invention provides an apparatus for reproducing information from a recording disc having a post cutting area and a data area, comprising first means for reading out a scrambled version of a SID code word from the post cutting area of the disc, the SID code word representing a producer of the disc; second means for de-scrambling the scrambled version read out by the first means to recover the SID code word; third means for collating the SID code word recovered by the second means with reference SID code words to decide whether or not the disc is legitimate; fourth means for reading out main information from the data area of the disc when the third means decides that the disc is legitimate; and fifth means for inhibiting readout of the main information from the data area of the disc when the third means decides that the disc is not legitimate.

An eighth aspect of this invention provides an apparatus for reproducing information from a recording disc having a TOC area and a data area, comprising first means for reading out a scrambled version of a SID code word from the TOC area of the disc, the SID code word representing a producer of the disc; second means for de-scrambling the scrambled version read out by the first means to recover the SID code word; third means for collating the SID code word recovered by the second means with reference SID code words to decide whether or not the disc is legitimate; fourth means for reading out main information from the data area of the disc when the third means decides that the disc is legitimate; and fifth means for inhibiting readout of the main information from the data area of the disc when the third means decides that the disc is not legitimate.

A ninth aspect of this invention provides a method of recording copyright information on a recording disc, comprising the steps of scrambling a SID code word into a scrambled version, the SID code word representing a producer of the disc; and recording the scrambled version of the SID code word on a lead-in area of the disc.

A tenth aspect of this invention is based on the ninth aspect thereof, and provides a method further comprising the steps of scrambling an ISRC code word into a scrambled version, the ISRC code word representing a source of a program recorded on the disc; and recording the scrambled version of the ISRC code word on the lead-in area of the disc.

An eleventh aspect of this invention provides a method of recording copyright information on a recording disc, comprising the steps of scrambling a SID code word into a scrambled version, the SID code word representing a producer of the disc; and writing the scrambled version of the SID code word on the disc by laser cutting.

A twelfth aspect of this invention provides a method of recording copyright information on a recording disc, comprising the steps of scrambling a SID code word into a scrambled version, the SID code word representing a producer of the disc; and recording the scrambled version of the SID code word on a TOC area of the disc.

A thirteenth aspect of this invention provides an apparatus for recording copyright information on a recording disc, comprising first means for scrambling a SID code word into a scrambled version, the SID code word representing a producer of the disc; and second means for recording the scrambled version of the SID code word on a lead-in area of the disc.

A fourteenth aspect of this invention is based on the thirteenth aspect thereof, and provides an apparatus further comprising third means for scrambling an ISRC code word into a scrambled version, the ISRC code word representing a source of a program recorded on the disc; and fourth means for recording the scrambled version of the ISRC code word on the lead-in area of the disc.

A fifteenth aspect of this invention provides an apparatus for recording copyright information on a recording disc, comprising first means for scrambling a SID code word into a scrambled version, the SID code word representing a producer of the disc; and second means for writing the scrambled version of the SID code word on the disc by laser cutting.

A sixteenth aspect of this invention provides an apparatus for recording copyright information on a recording disc, comprising first means for scrambling a SID code word into a scrambled version, the SID code word representing a producer of the disc; and second means for recording the scrambled version of the SID code word on a TOC area of the disc.

A seventeenth aspect of this invention provides a recording disc having a lead-in area storing a scrambled version of a SID code word which represents a disc producer.

An eighteenth aspect of this invention is based on the seventeenth aspect thereof, and provides a recording disc which has a data area storing a musical program, the lead-in area storing a scrambled version of an ISRC code word which represents a source of the musical program.

A nineteenth aspect of this invention provides a recording disc having a post cutting area storing a scrambled version of a SID code word which represents a disc producer.

A twentieth aspect of this invention provides a recording disc having a TOC area storing a scrambled version of a SID code word which represents a disc producer.

A twenty-first aspect of this invention is based on the seventeenth aspect thereof, and provides a recording disc wherein the lead-in area stores a CGMCAPS code word.

A twenty-second aspect of this invention is based on the eighteenth aspect thereof, and provides a recording disc wherein the lead-in area stores a CGMCAPS code word.

A twenty-third aspect of this invention is based on the nineteenth aspect thereof, and provides a recording disc wherein the post cutting area stores a CGMCAPS code word.

A twenty-fourth aspect of this invention is based on the twentieth aspect thereof, and provides a recording disc wherein the TOC area stores a CGMCAPS code word.

BRIEF DESCRIPTION OF THE DRAWINGS

FIG. 25 is a diagram of the relation among CGMCAPS code words, copy permission, and copy inhibition.

DESCRIPTION OF THE PREFERRED EMBODIMENTS

First Embodiment

A DVD-audio (digital video disc audio) has a post cutting area (PCA), a lead-in area, a data area, and a lead-out area arranged in that order along a radially outward direction. The data area stores main information representing, for example, a musical program. The musical program may be replaced by a computer game program or a video program. The lead-in area includes a control area.

Figure 1:
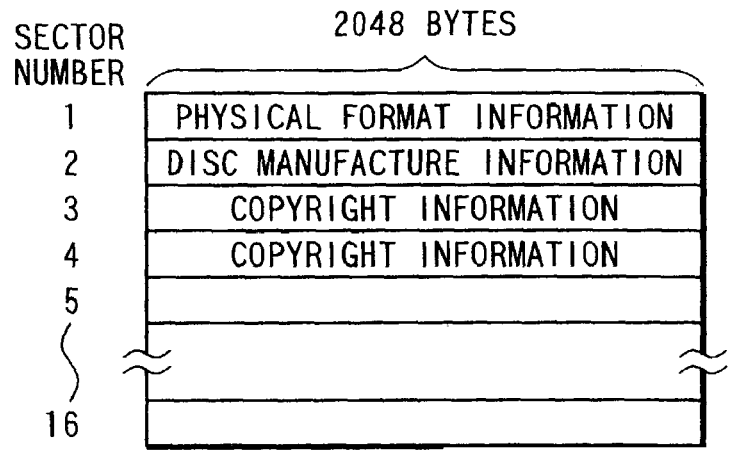
FIG. 1 is a diagram of the relation between sectors on a disc and recorded information pieces according to a first embodiment of this invention.

As shown in FIG. 1, the control area has 16 sectors "1", "2", . . . , and "16" each having 2,048 bytes. Physical format information is recorded on the sector "1". Disc manufacture information is recorded on the sector "2". Copyright information (copyright management information) is recorded on the sectors "3" and "4".

Figure 2:
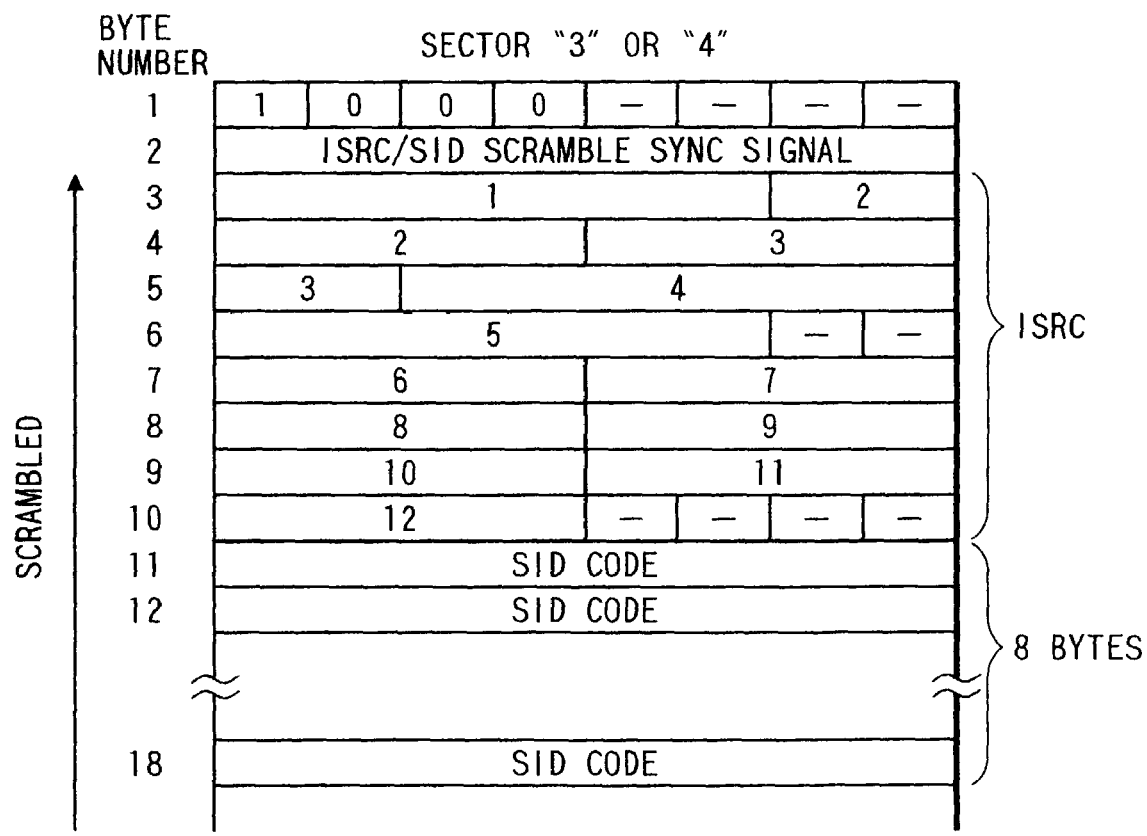
FIG. 2 is a diagram of the relation between bytes and the contents of copyright information in the first embodiment of this invention.

As shown in FIG. 2, a word of a 4-bit copy inhibition code is recorded on the first byte of the sector "3" and also the first byte of the sector "4". The copy inhibition code word is a portion of the copyright information. The word "1000" of the copy inhibition code indicates "copy inhibition". The word "1100" of the copy inhibition code indicates "copy permission". The word "1010" of the copy inhibition code indicates "permission of copy only once".

In each of the sector "3" and the sector "4", the second byte to the eighteenth byte are assigned to a sync signal for scramble, a word of an ISRC (International Standard Recording Code) for one title, and a word of a SID (source identification) code for one title. The sync signal for scramble, the ISRC word, and the SID code word are portions of the copyright information. The word of the ISRC indicates the source of a musical program represented by the main information. The word of the SID code indicates a disc producer or a disc manufacturer. Specifically, the second byte stores an 8-bit sync signal for scrambling an ISRC word and a SID code word. The third byte to the tenth byte store a scrambled version of a 60-bit ISRC word. The eleventh byte to the eighteenth byte store a scrambled version of a SID code word corresponding to eight letters or eight characters. Accordingly, the third byte to the eighteenth byte (that is, 16 bytes) store the scrambled version of the ISRC word and the SID code word, for one title.

In each of the sector "3" and the sector "4", the nineteenth byte and later bytes similarly store the, scrambled versions of ISRC words and SID code words. Specifically, the nineteenth byte and later bytes are grouped into 16-byte blocks each storing the scrambled version of an ISRC word and the scrambled version of a SID code word for one title. In total, ISRC words and SID code words for 99 titles are recorded.

It should be noted that ISRC words may be directly recorded without being scrambled.

Each ISRC word indicates 12 characters or 12 letters. Regarding the ISRC word, 6 bits are assigned to each of the first character to the fifth character while 4 bits are assigned to each of the sixth character to the twelfth character. There are 6 bits corresponding to blanks.

It should be noted that a way of scrambling the ISRC words and the SID code words may be similar to or different from a way of scrambling a musical program recorded on the data area of the disc.

Second Embodiment

A second embodiment of this invention is similar to the first embodiment thereof except for design changes explained later.

A DVD-audio (digital video disc audio) has a post cutting area (PCA), a lead-in area, a data area, and a lead-out area arranged in that order along a radially outward direction. The data area stores main information representing, for example, a musical program.

The lead-in area includes an area assigned to copyright information, specifically copyright management information (CMI) having a length variable in the range of 16 bytes (128 bits) to 188 bytes (1,504 bits).

Figure 3:
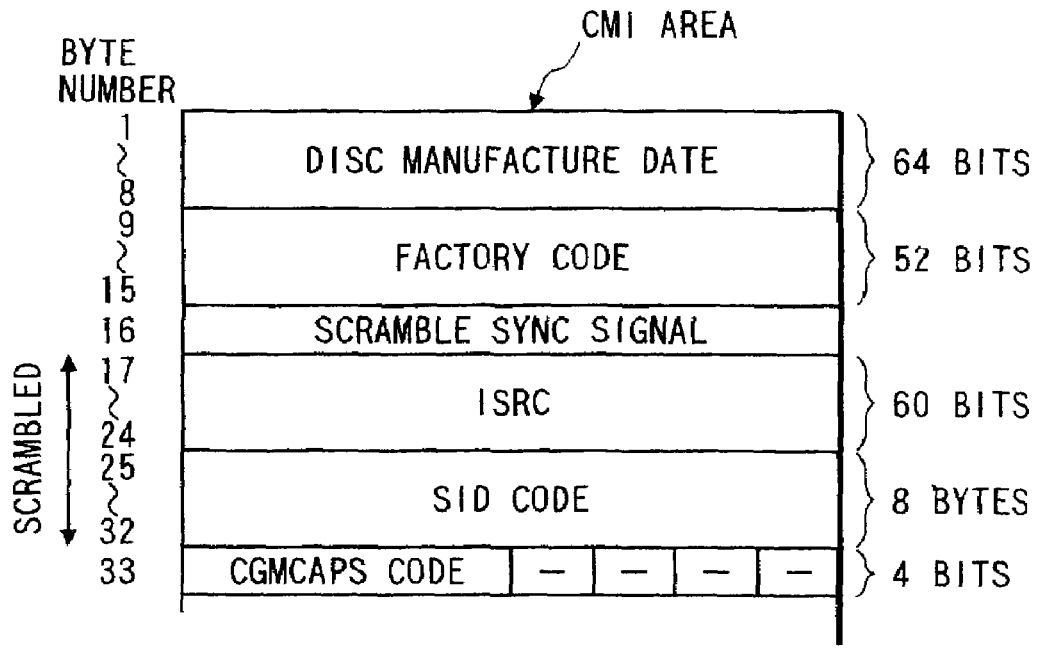
FIG. 3 is a diagram of the relation between bytes and the contents of copyright management information in a second embodiment of this invention.

As shown in FIG. 3, the CMI area stores 64-bit data indicating the date of the manufacture of the disc, a word of a 52-bit code indicating a disc making factory, an 8-bit sync signal for scramble, a scrambled version of a 60-bit ISRC word for a first title, a scrambled version of a 8-byte SID code word for the first title, and a word of a 4-bit CGMCAPS (Copy Generation Management Control Audio Protection System) code for the first title. The CGMCAPS code word indicates the number of times of executed copy, that is, the number of copy generations. The CMI area further stores scrambled versions of ISRC words and SID code words, and CGMCAPS code words for second and later titles. The previously-indicated information pieces stored in the CMI area compose the copyright management information.

The lead-in area includes a control area (a control data area) which is previously made as a RAM area. The CMI area uses the RAM area, and the information assigned to the CMI area is recorded on the RAM area during the manufacture of the disc.

As shown in FIG. 25, the word "(1,1)" of the CGMCAPS code indicates "copy prevention" or "copy inhibition" for ROM media and RAM media. The word "(1,0)" of the CGMCAPS code indicates "copy prevention" or "copy inhibition" for ROM media and RAM media. The word "(1,0,1)" of the CGMCAPS code indicates "copy prevention" or "copy inhibition" for ROM media, and indicates "copy allowance" or "copy permission" for RAM media. The word "(0,0)" of the CGMCAPS code indicates "copy allowance" or "copy permission" for ROM media and RAM media.

Third Embodiment

A third embodiment of this invention is similar to the second embodiment thereof except for design changes explained later.

A DVD-audio (digital video disc audio) has a post cutting area (PCA), a lead-in area, a data area, and a lead-out area arranged in that order along a radially outward direction. The data area stores main information representing, for example, a musical program.

The lead-in area includes an area assigned to copyright information, specifically copyright management information (CMI) having a length variable in the range of 16 bytes (128 bits) to 188 bytes (1,504 bits).

Figure 4:
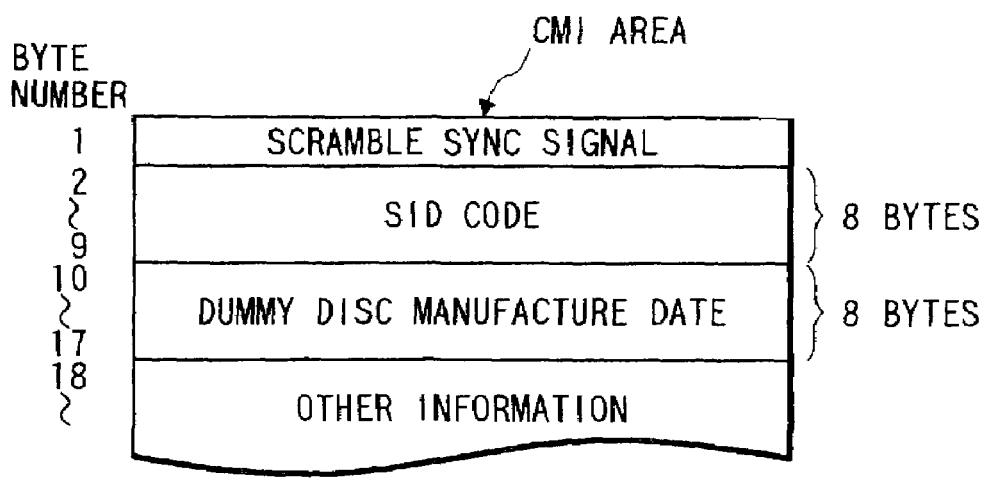
FIG. 4 is a diagram of the relation between bytes and the contents of copyright management information in a third embodiment of this invention.

As shown in FIG. 4, the CMI area successively stores an 8-bit sync signal for scramble, a scrambled version of a 8-byte SID code word for one title, and an 8-byte dummy signal representing the date of the manufacture of the disc. Thus, on the disc, the SID code word is immediately followed by the dummy signal of the disc manufacture date.

It should be noted that a scrambled version of the dummy signal may be recorded.

Fourth Embodiment

Figure 5:
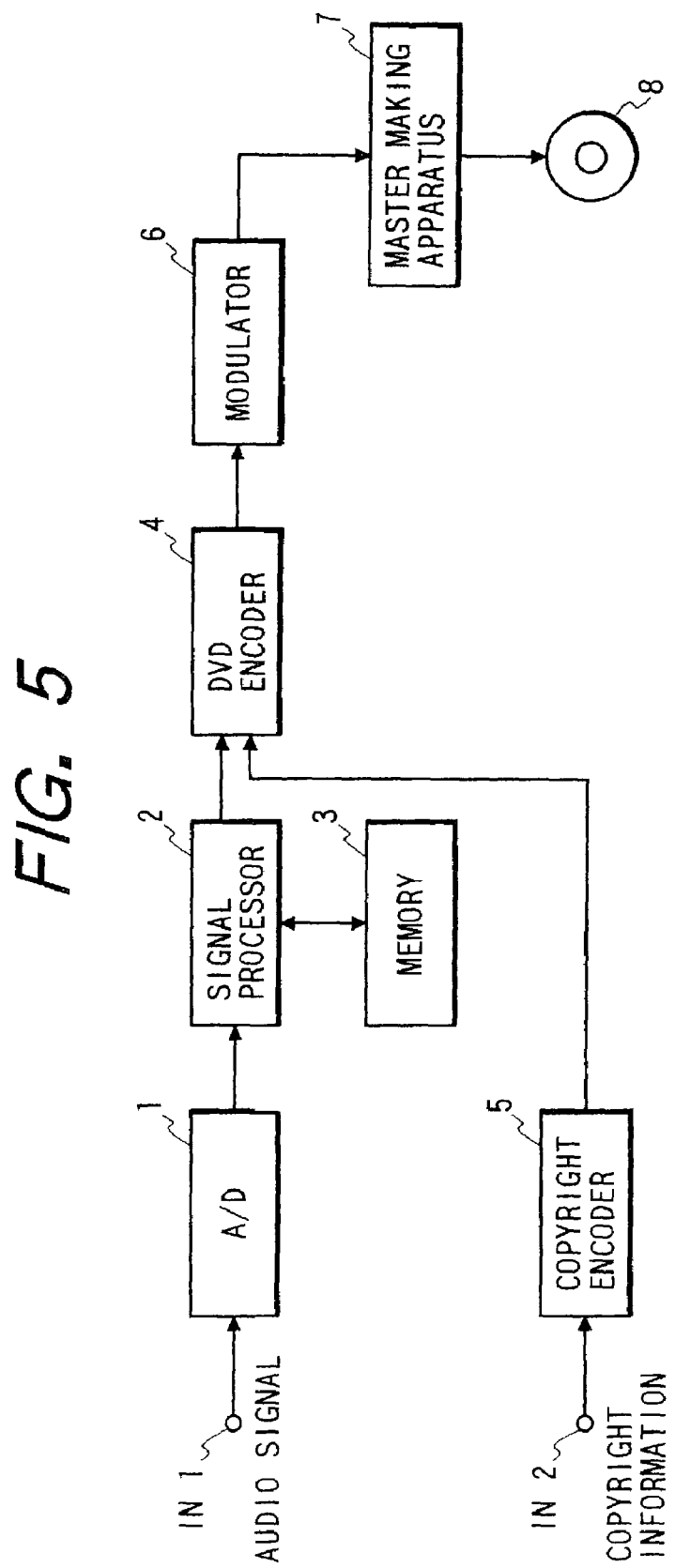
FIG. 5 is a block diagram of a signal processing apparatus according to a fourth embodiment of this invention.

With reference to FIG. 5, an analog audio signal representing a musical program is fed via an input terminal IN1 to an A/D converter 1. The A/D converter 1 changes the analog audio signal into a corresponding digital audio signal. The A/D converter 1 outputs the digital audio signal to a signal processor 2.

A memory 3 is connected to the signal processor 2. The signal processor 2 and the memory 3 cooperate to subject the digital audio signal to given processes such as an emphasis process, an equalizing process, a noise gating process, and an effect process. The signal processor 2 outputs the process-resultant signal to a DVD encoder 4. The output signal of the signal processor 2 contains the digital audio signal representing the musical program.

Copyright information (copyright management information) is fed via an input terminal IN2 to a copyright encoder 5. The copyright encoder 5 subjects the copyright information to given processes such as a copyright encoding process and a scrambling process. The copyright encoder 5 outputs the process-resultant signal to the DVD encoder 4. The output signal of the copyright encoder 5 contains a scrambled version of the copyright information.

The DVD encoder 4 packs the output signal of the signal processor 2 and the output signal of the copyright encoder 5 on a DVD encoding basis so that the scrambled version of the copyright information can be located in a disc lead-in area or a disc CMI area, and that the digital audio signal representing the musical program can be located in a disc data area. The DVD encoder 4 outputs the packing-resultant signal to a modulator 6.

The modulator 6 subjects the output signal of the DVD encoder 4 to EFM modulation. The modulator 6 outputs the modulation-resultant signal to a master making apparatus 7. The apparatus 7 makes a master disc 8 in response to the output signal of the modulator 6. The master disc 8 stores the output signal of the modulator 6.

Figure 6:
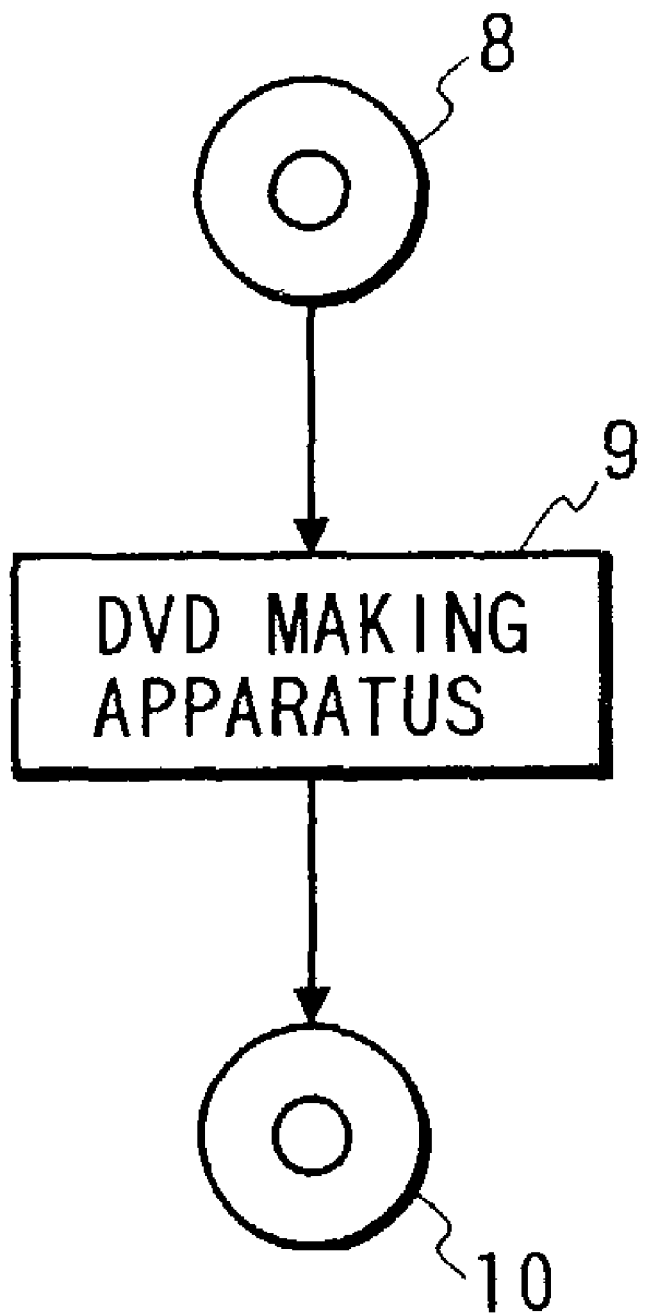
FIG. 6 is a block diagram of a master disc, a DVD making apparatus, and a DVD-audio in the fourth embodiment of this invention.

As shown in FIG. 6, the master disc 8 is set in a DVD making apparatus 9. The apparatus 9 makes DVD's-audio 10 on the basis of the master disc 8. In each of the DVD's-audio 10, the scrambled version of the copyright information is recorded on a lead-in area or a CMI area in a manner equal to that in one of the first embodiment, the second embodiment, and the third embodiment.

Fifth Embodiment

Figure 7:
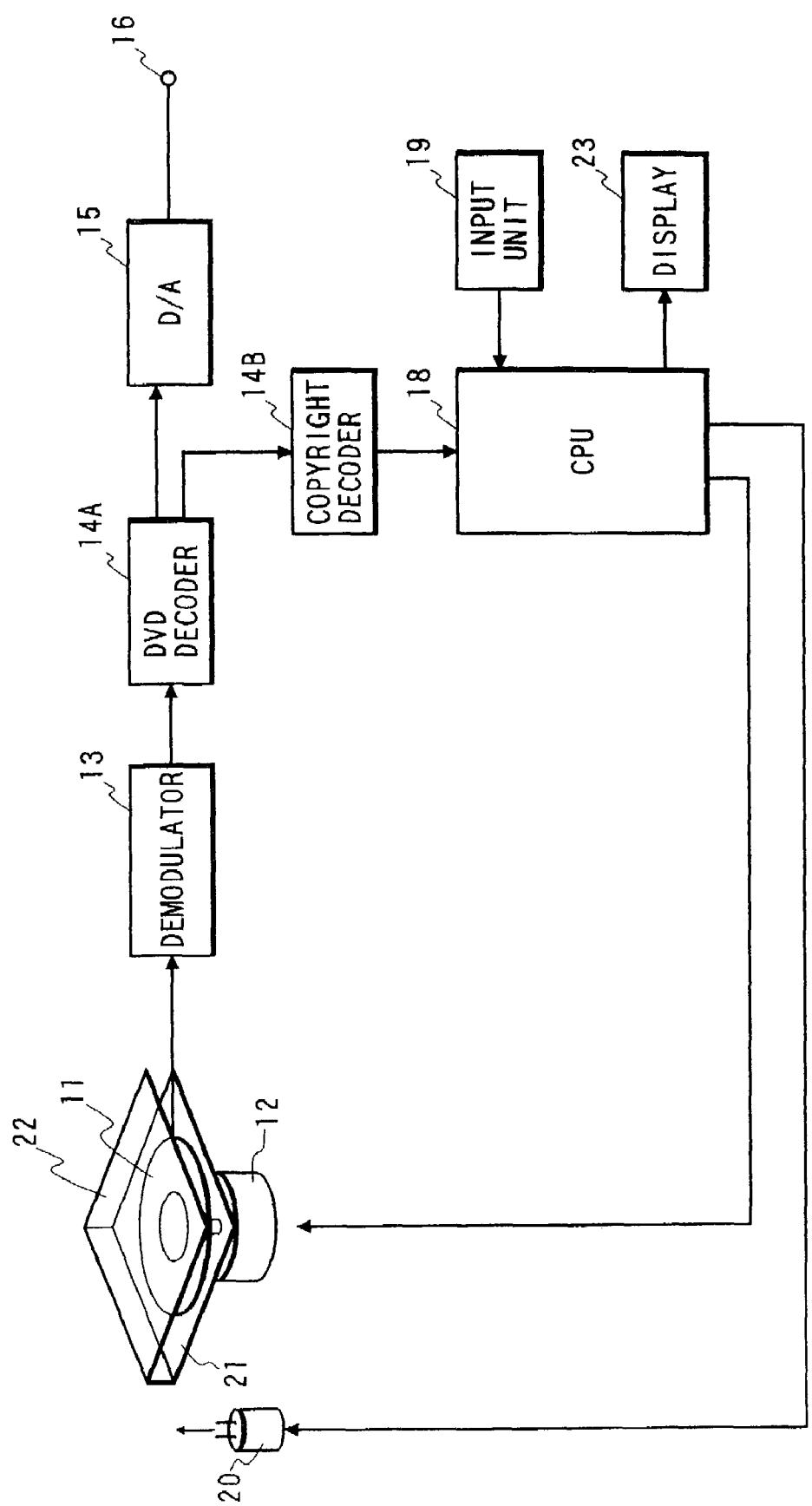
FIG. 7 is a block diagram of a disc player according to a fifth embodiment of this invention.

With reference to FIG. 7, a disc player includes a disc drive 12. The disc drive 12 has a tray 21 on which a disc 11 can be placed. The tray 21 is provided with a lid 22. The disc drive 12 serves to read out a recorded signal from the disc 11 placed therein. The disc 11 is, for example, a DVD-audio made according to the fourth embodiment. The disc drive 12 outputs the readout signal to a demodulator 13.

The demodulator 13 subjects the output signal of the disc drive 12 to EFM demodulation. The demodulator 13 outputs the demodulation-resultant signal to a DVD decoder 14A. The DVD decoder 14A unpacks the output signal of the demodulator 13 on a DVD decoding basis, and separates the output signal of the demodulator 13 into a digital audio signal of a musical program and a scrambled version of copyright information. The DVD decoder 14A outputs the digital audio signal to a D/A converter 15. The D/A converter 15 changes the digital audio signal into a corresponding analog audio signal. Generally, the D/A converter 15 feeds the analog audio signal to an audio apparatus (not shown) via an output terminal 16. The audio apparatus converts the analog audio signal into corresponding sound, thereby reproducing the musical program.

The DVD decoder 14A outputs the scrambled version of the copyright information to a copyright decoder 14B. The copyright decoder 14B subjects the output signal of the DVD decoder 14A to given processes such as a copyright decoding process and a de-scrambling process. Thereby, the copyright decoder 14B recovers the original copyright information. The copyright decoder 14B outputs the recovered copyright information to a CPU 18.

The CPU 18 includes a combination of an input/output port, a processing section, a ROM, and a RAM. The CPU 18 operates in accordance with a control program stored in the ROM. The CPU 18 is connected to the disc drive 12, an input unit 19, a disc ejecting mechanism 20, and a display 23.

It should be noted that the CPU 18 may be replaced by a microcomputer or a similar device.

Figure 8:
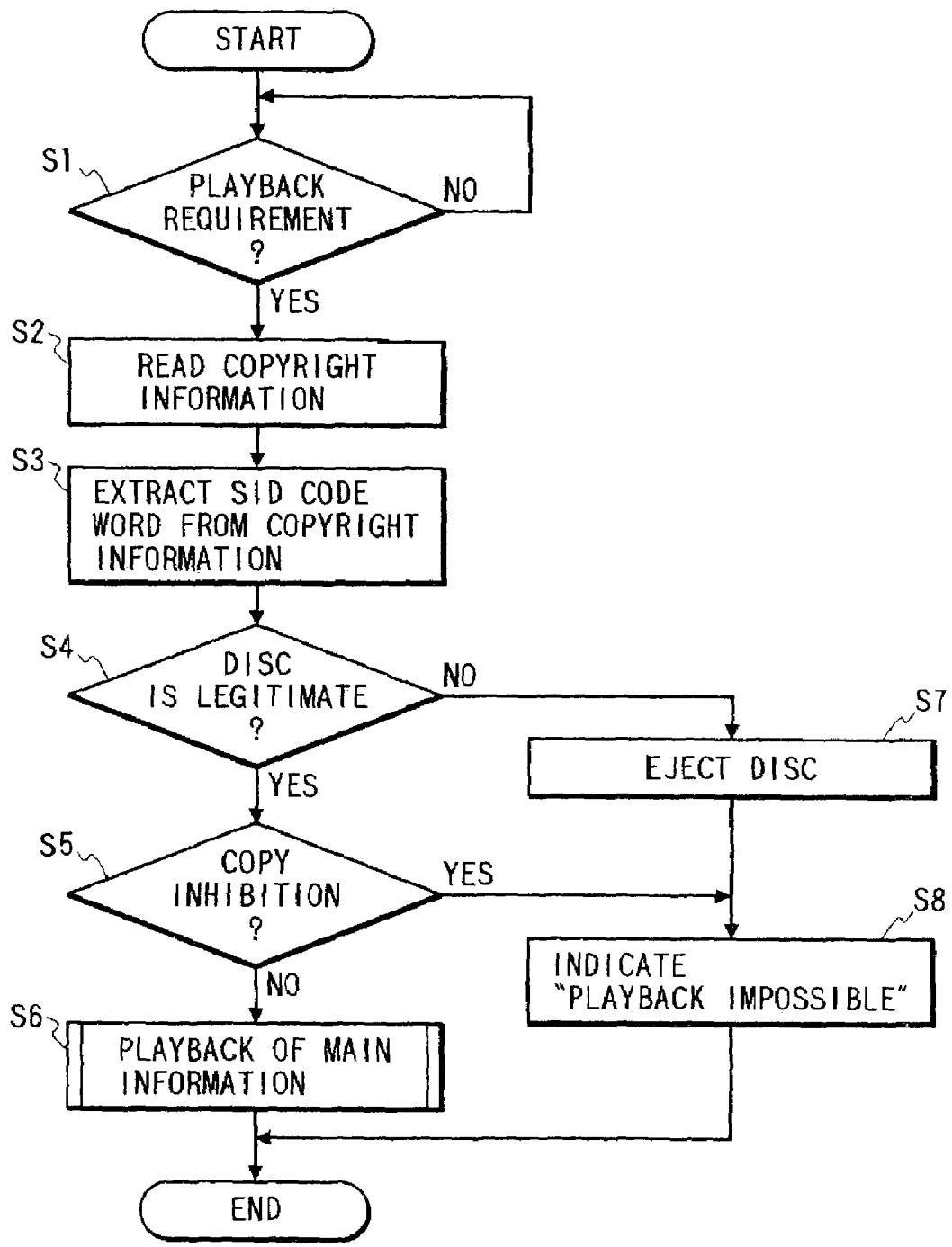
FIG. 8 is a flowchart of a segment of a control program for a CPU in FIG. 7.

FIG. 8 is a flowchart of a segment of the control program for the CPU 18 which is started when a disc 11 is set in position within the disc drive 12. As shown in FIG. 8, a first step S1 of the control program decides whether or not a playback start requirement is inputted via the input unit 19. When the playback start requirement is inputted, the program advances from the step S1 to a step S2. Otherwise, the step S1 is repeated.

The step S2 controls the disc drive 12 so that the disc drive 12 will read out a recorded signal from a lead-in area of the disc 11. The readout signal is converted into original copyright information (recovered copyright information) by the demodulator 13, the DVD decoder 14A, and the copyright decoder 14B. The step S2 fetches the recovered copyright information from the copyright decoder 14B.

A step S3 following the step S2 extracts a SID code word (a recovered SID code word) from the recovered copyright information.

A step S4 subsequent to the step S3 collates the recovered SID code word with reference SID code words to decide whether the disc 11 is legitimate or pirated. When the recovered SID code word agrees with one of the reference SID code words, that is, when the disc 11 is decided to be legitimate, the program advances from the step S4 to a step S5. When the recovered SID code word agrees with none of the reference SID code words, that is, when the disc 11 is decided to be pirated, the program advances from the step S4 to a step S7.

The step S5 extracts a copy inhibition code word from the recovered copyright information. The step S5 decides whether or not the copy inhibition code word indicates "copy inhibition". When the copy inhibition code word does not indicate "copy inhibition", the program advances from the step S5 to a block S6. When the copy inhibition code word indicates "copy inhibition", the program advances from the step S5 to a step S8.

In the absence of the copy inhibition code word, the step S5 extracts a CGMCAPS code word from the recovered copyright information. The step S5 decides whether or not the number of times of executed copy which is represented by the CGMCAPS code word reaches an upper limit number (a predetermined reference number). When the number of times of executed copy reaches the upper limit number, the program advances from the step S5 to the step S8. When the number of times of executed copy does not reach the upper limit number, the program advances from the step S5 to the block S6. In this case, the step S5 may increment the number of times of executed copy by "1", and correspondingly update the CGMCAPS code word in the disc 11 by use of a recording apparatus (not shown) for accessing a RAM area of the disc 11.

The block S6 controls the disc drive 12 so that the disc drive 12 will read out a recorded signal from a data area of the disc 11. The readout signal is converted into an analog audio signal (a recovered analog audio signal) by the demodulator 13, the DVD decoder 14A, and the D/A converter 15. The recovered analog audio signal which represents a musical program is transmitted from the D/A converter 15 to an audio apparatus via the output terminal 16. In this way, the block S6 implements playback of the musical program. After the block S6, the current execution cycle of the control program segment ends.

The step S7 suspends operation of the disc drive 12. Then, the step S7 activates the disc ejecting mechanism 20 to eject the disc 11 from the disc drive 12. After the step S7, the program advances to the step S8.

The step S8 controls the display 23 so that "playback impossible" will be indicated thereon. After the step S8, the current execution cycle of the control program segment ends.

Sixth Embodiment

Figure 9:
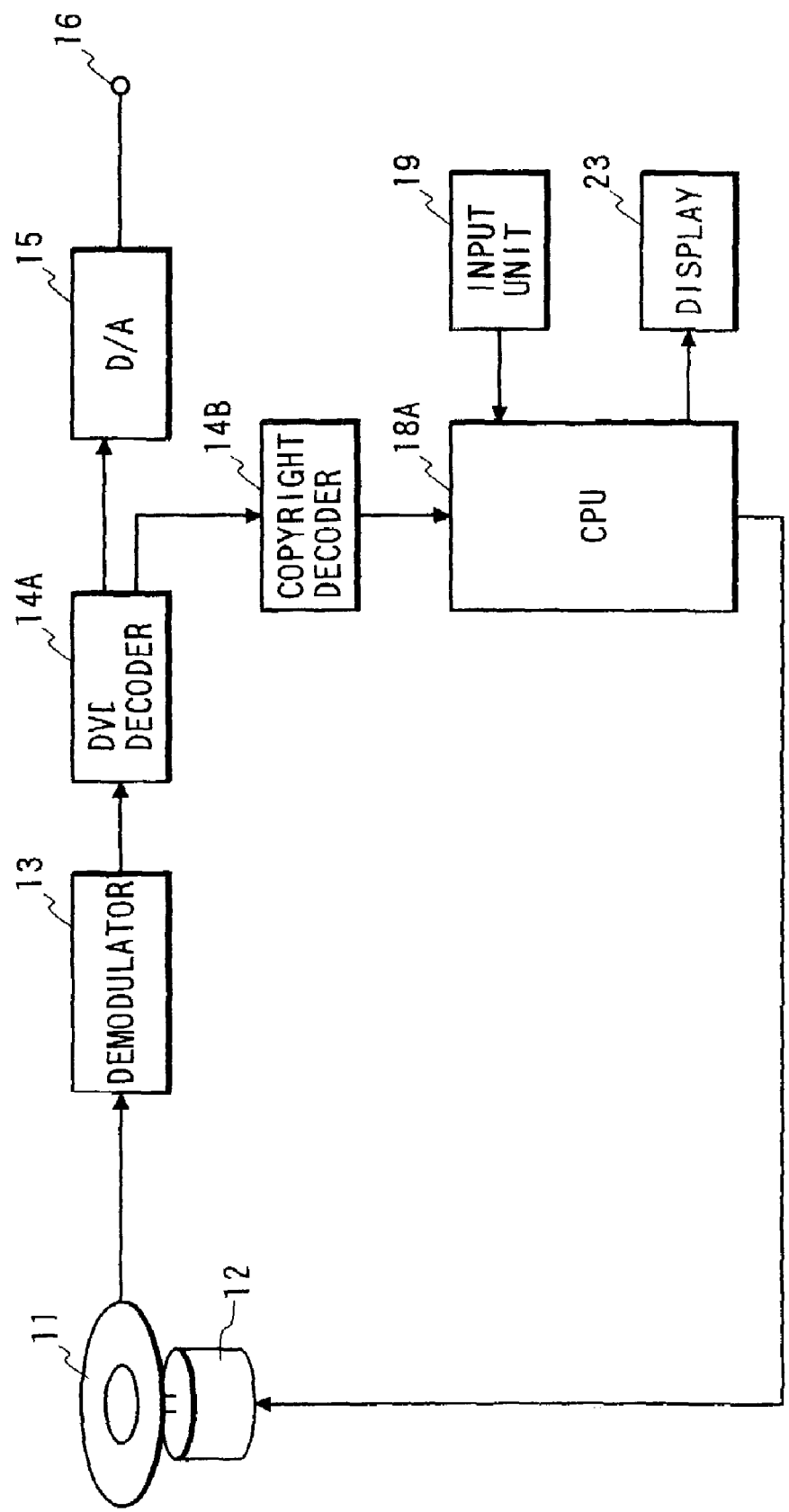
FIG. 9 is a block diagram of a disc player according to a sixth embodiment of this invention.

With reference to FIG. 9, a disc player includes a disc drive 12. The disc drive 12 serves to read out a recorded signal from a disc 11 placed therein. The disc 11 is, for example, a DVD-audio made according to the fourth embodiment. The disc drive 12 outputs the readout signal to a demodulator 13.

The demodulator 13 subjects the output signal of the disc drive 12 to EFM demodulation. The demodulator 13 outputs the demodulation-resultant signal to a DVD decoder 14A. The DVD decoder 14A unpacks the output signal of the demodulator 13 on a DVD decoding basis, and separates the output signal of the demodulator 13 into a digital audio signal of a musical program and a scrambled version of copyright information. The DVD decoder 14A outputs the digital audio signal to a D/A converter 15. The D/A converter 15 changes the digital audio signal into a corresponding analog audio signal. Generally, the D/A converter 15 feeds the analog audio signal to an audio apparatus (not shown) via an output terminal 16. The audio apparatus converts the analog audio signal into corresponding sound, thereby reproducing the musical program.

The DVD decoder 14A outputs the scrambled version of the copyright information to a copyright decoder 14B. The copyright decoder 14B subjects the output signal of the DVD decoder 14A to given processes such as a copyright decoding process and a de-scrambling process. Thereby, the copyright decoder 14B recovers the original copyright information. The copyright decoder 14B outputs the recovered copyright information to a CPU 18A.

The CPU 18A includes a combination of an input/output port, a processing section, a ROM, and a RAM. The CPU 18A operates in accordance with a control program stored in the ROM. The CPU 18A is connected to the disc drive 12, an input unit 19, and a display 23.

It should be noted that the CPU 18A may be replaced by a microcomputer or a similar device.

Figure 10:
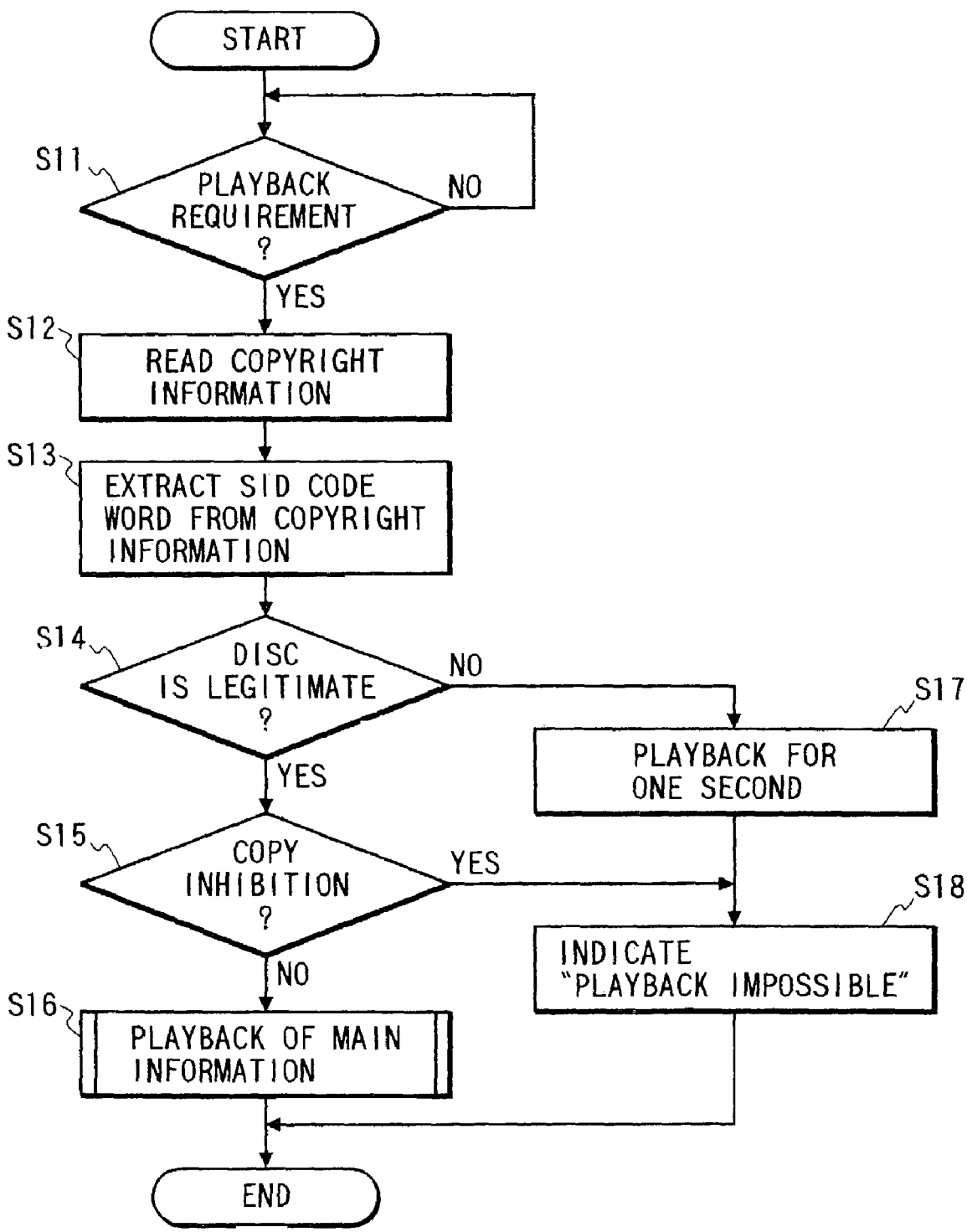
FIG. 10 is a flowchart of a segment of a control program for a CPU in FIG. 9.

FIG. 10 is a flowchart of a segment of the control program for the CPU 18A which is started when a disc 11 is set in position within the disc drive 12. As shown in FIG. 10, a first step S11 of the control program decides whether or not a playback start requirement is inputted via the input unit 19. When the playback start requirement is inputted, the program advances from the step S11 to a step S12. Otherwise, the step S11 is repeated.

The step S12 controls the disc drive 12 so that the disc drive 12 will read out a recorded signal from a lead-in area of the disc 11. The readout signal is converted into original copyright information (recovered copyright information) by the demodulator 13, the DVD decoder 14A, and the copyright decoder 14B. The step S12 fetches the recovered copyright information from the copyright decoder 14B.

A step S13 following the step S12 extracts a SID code word (a recovered SID code word) from the recovered copyright information.

A step S14 subsequent to the step S13 collates the recovered SID code word with reference SID code words to decide whether the disc 11 is legitimate or pirated. When the recovered SID code word agrees with one of the reference SID code words, that is, when the disc 11 is decided to be legitimate, the program advances from the step S14 to a step S15. When the recovered SID code word agrees with none of the reference SID code words, that is, when the disc 11 is decided to be pirated, the program advances from the step S14 to a block S17.

The step S15 extracts a copy inhibition code word from the recovered copyright information. The step S15 decides whether or not the copy inhibition code word indicates "copy inhibition". When the copy inhibition code word does not indicate "copy inhibition", the program advances from the step S15 to a block S16. When the copy inhibition code word indicates "copy inhibition", the program advances from the step S15 to a step S18.

The block S16 controls the disc drive 12 so that the disc drive 12 will read out a recorded signal from a data area of the disc 11. The readout signal is converted into an analog audio signal (a recovered analog audio signal) by the demodulator 13, the DVD decoder 14A, and the D/A converter 15. The recovered analog audio signal which represents a musical program is transmitted from the D/A converter 15 to an audio apparatus via the output terminal 16. In this way, the block S16 implements playback of the musical program. After the block S16, the current execution cycle of the control program segment ends.

The block S17 controls the disc drive 12 so that the disc drive 12 will read out the recorded signal from the data area of the disc 11 only during a given limited time. The given limited time is equal to, for example, about 1 second. The readout signal is converted into an analog audio signal (a recovered analog audio signal) by the demodulator 13, the DVD decoder 14A, and the D/A converter 15. The recovered analog audio signal which represents a limited portion of the musical program is transmitted from the D/A converter 15 to the audio apparatus via the output terminal 16. In this way, the block S17 implements playback of the limited portion of the musical program. In other words, the block S17 implements playback of the musical program during only the limited time (for example, about 1 second). The playback of the musical program for the limited time is to inform the user that the disc 11 is not defective. Then, the block S17 suspends operation of the disc drive 12. After the block S17, the program advances to the step S18.

The step S18 controls the display 23 so that "playback impossible" will be indicated thereon. After the step S18, the current execution cycle of the control program segment ends.

Seventh Embodiment

Figure 11:
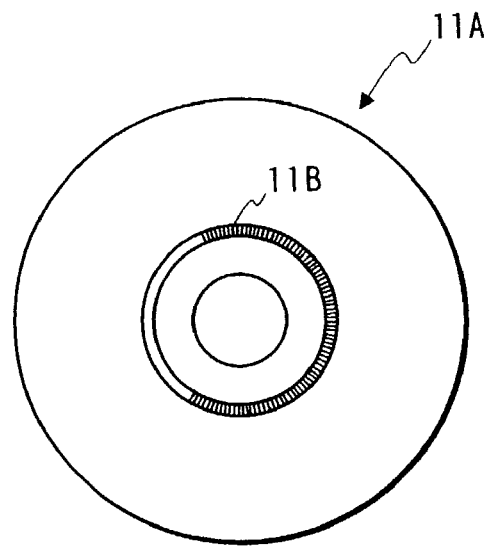
FIG. 11 is a plan view of a recording disc according to a seventh embodiment of this invention.

With reference now to FIG. 11, a recording disc 11A such as a DVD-audio has a post cutting area (PCA) 11B extending inward of a lead-in area 11C. The recording disc 11A also has a data area 11D on which the main information (a musical program) is recorded and a lead-out area 11E. After a stamping process is completed, a scrambled version of copyright information (copyright management information) is recorded on the post cutting area 11B of the recording disc 11A as follows.

Figure 12:
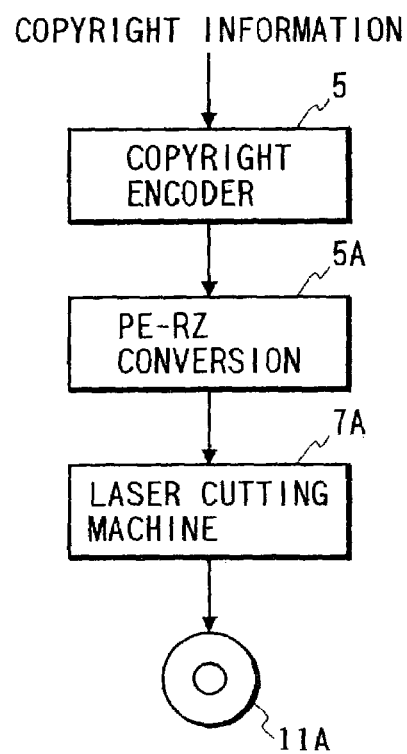
FIG. 12 is a block diagram of an apparatus for writing copyright information on a recording disc in the seventh embodiment of this invention.

As shown in FIG. 12, a copyright encoder 5 receives copyright information. The copyright encoder 5 subjects the copyright information to given processes such as a copyright encoding process and a scrambling process. The copyright encoder 5 outputs the process-resultant signal to a signal converter 5A. The output signal of the copyright encoder 5 contains a scrambled version of the copyright information.

The signal converter 5A changes the output signal of the copyright encoder 5 into a PE-RZ (phase-encoding return-to-zero) signal. Thus, the signal converter 5A is a PE-RZ modulator. The signal converter 5A outputs the PE-RZ signal to a laser cutting machine 7A.

The laser cutting machine 7A modulates a laser beam in accordance with the PE-RZ signal. The laser cutting machine 7A applies the modulation-resultant laser beam to the recording disc 11A while rotating the recording disc 11A. Thereby, the laser cutting machine 7A writes a bar-code pattern on the post cutting area 11B of the recording disc 11A. The bar-code pattern corresponds to the PE-RZ signal which contains the scrambled version of the copyright information.

Figure 13:
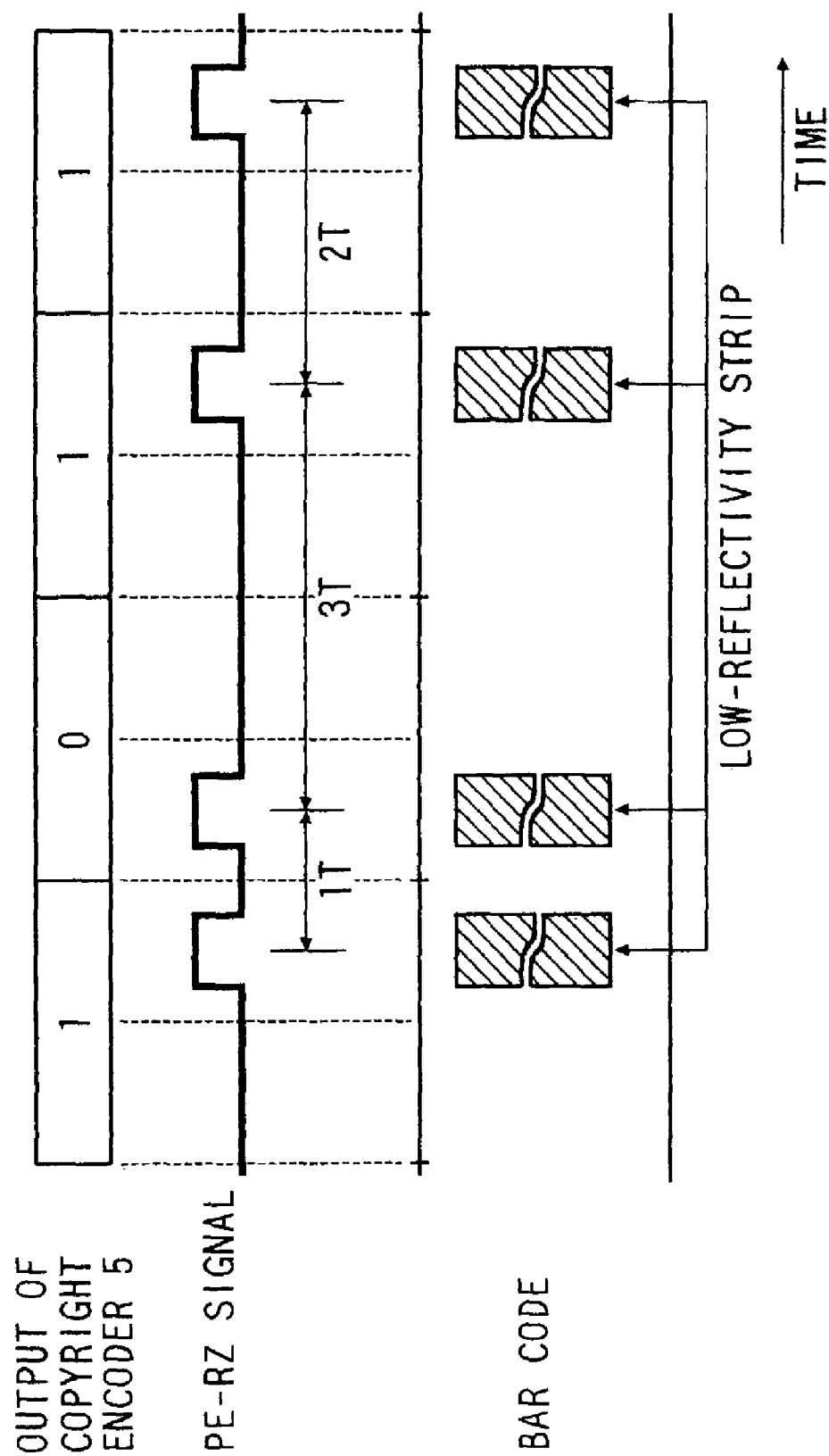
FIG. 13 is a time-domain diagram of an output signal of a copyright encoder, a PE-RZ signal, and a bar code on a recording disc in the seventh embodiment of this invention.

As shown in FIG. 13, the PE-RZ signal outputted from the signal converter 5A is of the return-to-zero type. The PE-RZ signal is of the phase-encoding type. Specifically, the phase of the PE-RZ signal depends on whether every bit of the output signal of the copyright encoder 5 is "1" or "0". Portions of a reflecting film, which are exposed to the modulation-resultant laser light beam corresponding to the PE-RZ signal being "1", are removed from the post cutting area 11B of the recording disc 11A. Accordingly, these portions form low-reflectivity strips on the post cutting area 11B of the recording disc 11A. On the other hand, portions of the reflecting film, which are exposed to the modulation-resultant laser light beam corresponding to the PE-RZ signal being "0", remain on the post cutting area 11B of the recording disc 11A. Accordingly, these portions form high-reflectivity zones on the post cutting area 11B of the recording disc 11A. In this way, a bar-code pattern corresponding to the PE-RZ signal is written on the post cutting area 11B of the recording disc 11A.

The contents of the copyright information are similar to the contents of the copyright information in the first embodiment. The contents of the copyright information may be similar to the contents of the copyright management information in the second embodiment or the contents of the copyright management information in the second embodiment.

Eighth Embodiment

Figure 14:
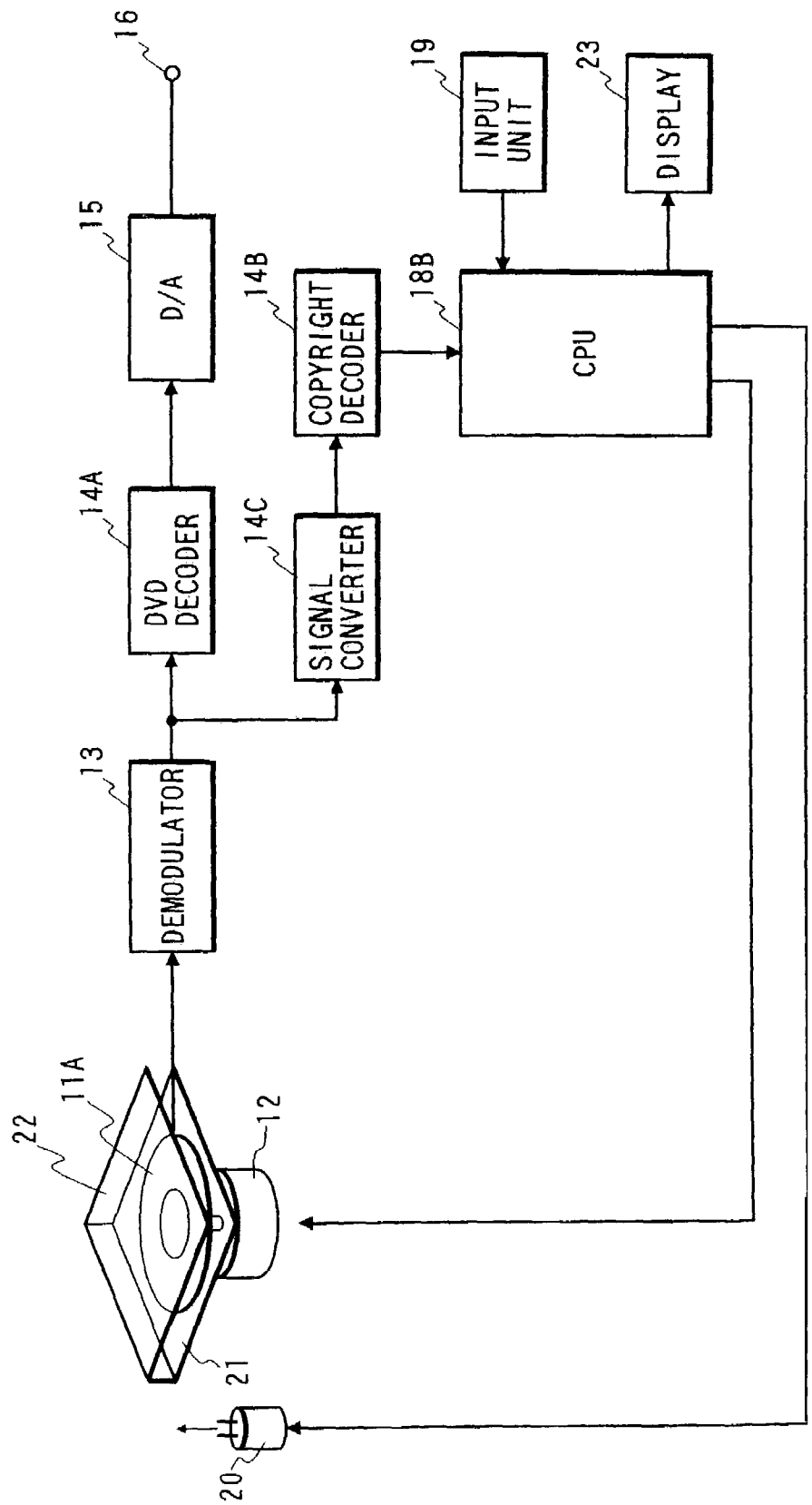
FIG. 14 is a block diagram of a disc player according to an eighth embodiment of this invention.

FIG. 14 shows an eighth embodiment of this invention which is similar to the fifth embodiment (FIGS. 7 and 8) thereof except for design changes indicated hereinafter. The embodiment of FIG. 14 is designed to reproduce information from a disc 11A in the seventh embodiment. The embodiment of FIG. 14 includes a signal converter 14C between the demodulator 13 and the copyright decoder 14B. The embodiment of FIG. 14 uses a CPU 18B instead of the CPU 18 in FIG. 7.

The signal converter 14C receives the demodulation-resultant signal from the demodulator 13 which agrees with a PE-RZ signal containing a scrambled version of copyright information. The signal converter 14C decodes the PE-RZ signal, and outputs the decoding-resultant signal to the copyright decoder 14B. The signal converter 14C is a PE-RZ signal demodulator.

The copyright decoder 14B subjects the output signal of the signal converter 14C to given processes such as a copyright decoding process and a de-scrambling process. Thereby, the copyright decoder 14B recovers the original copyright information. The copyright decoder 14B outputs the recovered copyright information to the CPU 18B.

Figure 15:
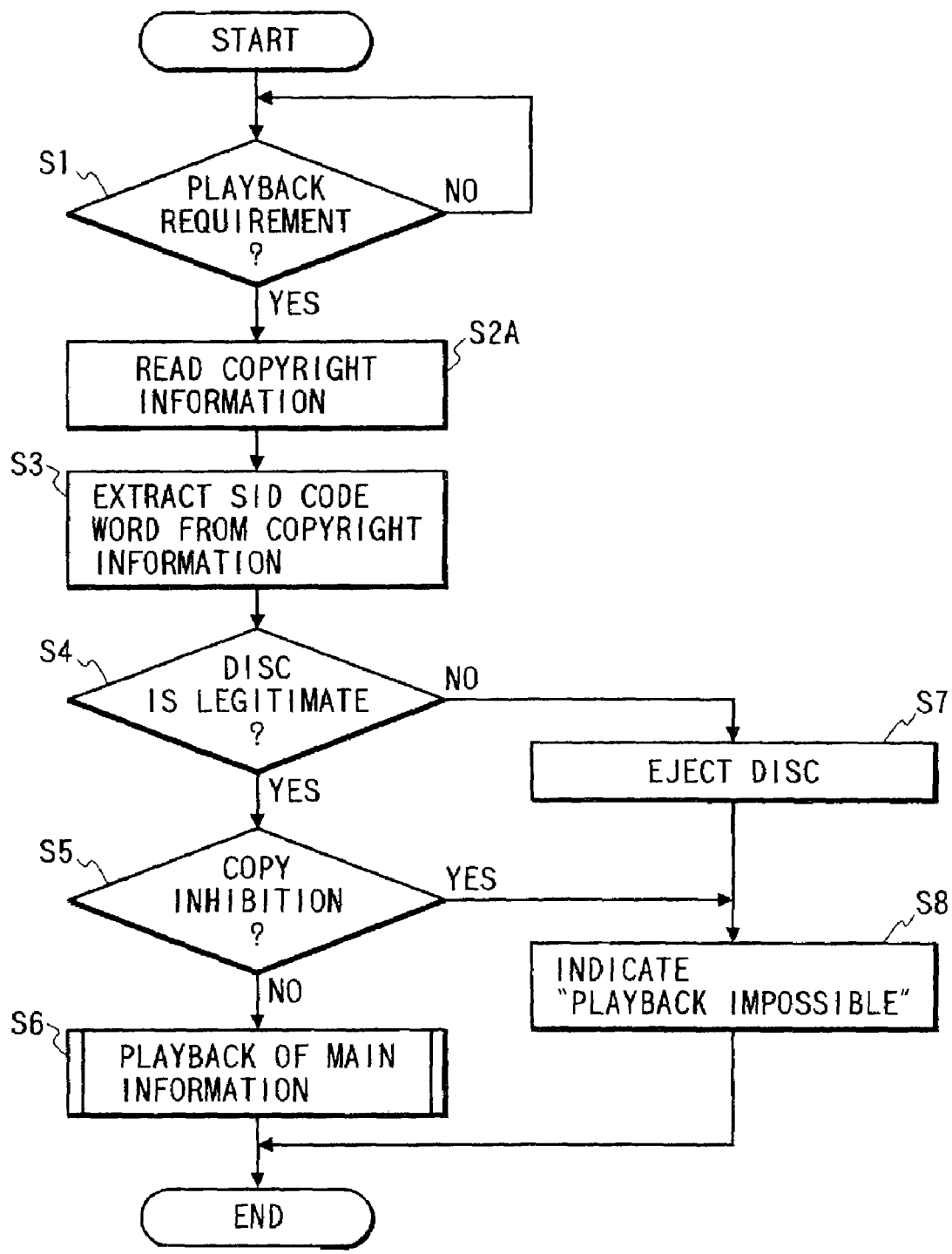
FIG. 15 is a flowchart of a segment of a control program for a CPU in FIG. 14.

FIG. 15 is a flowchart of a segment of a control program for the CPU 18B which is started when a disc 11A is set in position within the disc drive 12. The control program segment in FIG. 15 includes a step S2A instead of the step S2 in FIG. 8.

The step S2A controls the disc drive 12 so that the disc drive 12 will read out a recorded signal from a post cutting area of the disc 11A. The readout signal is converted into original copyright information (recovered copyright information) by the demodulator 13, the signal converter 14C, and the copyright decoder 14B. The step S2A fetches the recovered copyright information from the copyright decoder 14B.

Ninth Embodiment

Figure 16:
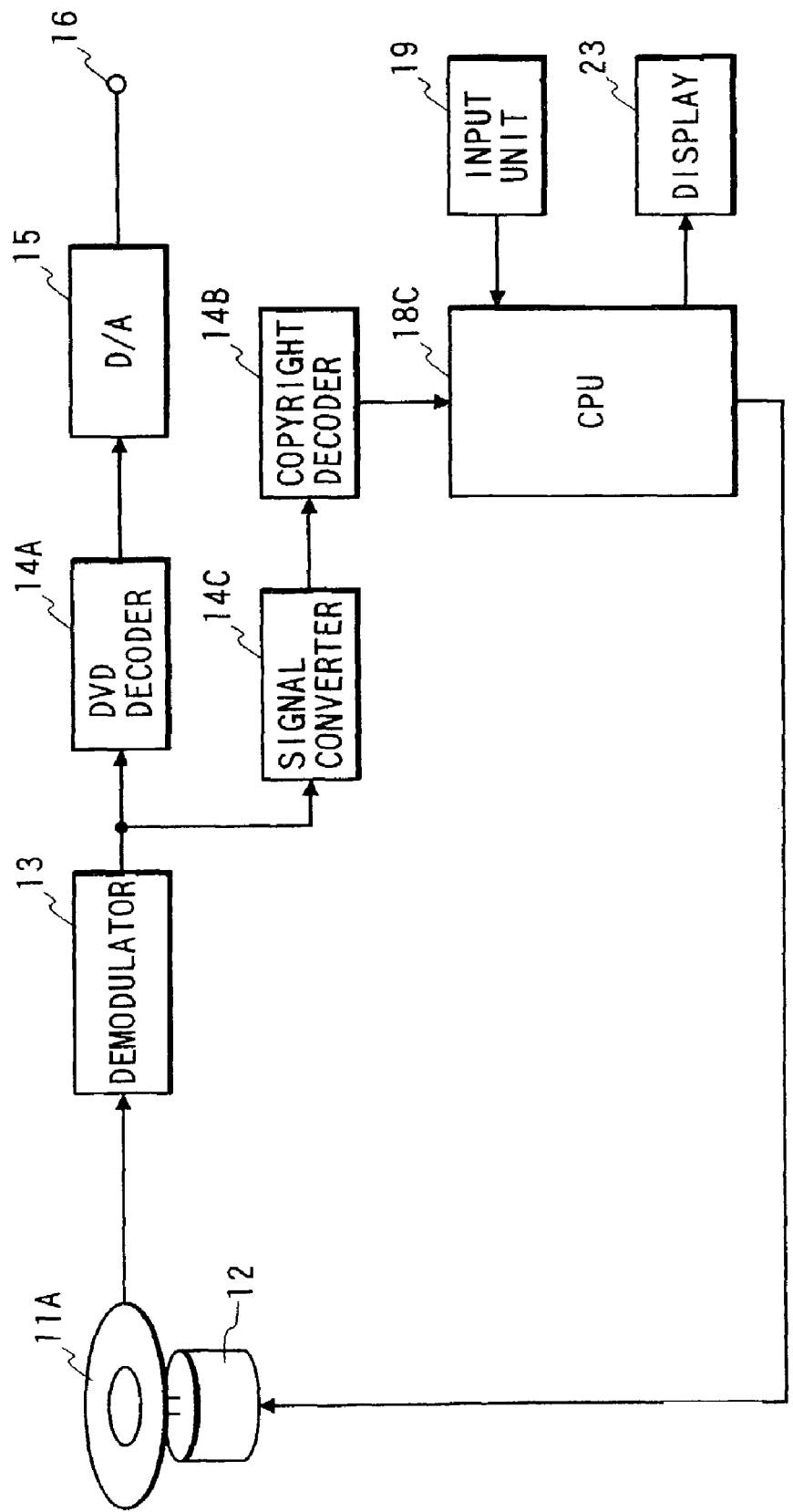
FIG. 16 is a block diagram of a disc player according to a ninth embodiment of this invention.

FIG. 16 shows a ninth embodiment of this invention which is similar to the sixth embodiment (FIGS. 9 and 10) thereof except for design changes indicated hereinafter. The embodiment of FIG. 16 is designed to reproduce information from a disc 11A in the seventh embodiment. The embodiment of FIG. 16 includes a signal converter 14C between the demodulator 13 and the copyright decoder 14B. The embodiment of FIG. 16 uses a CPU 18C instead of the CPU 18A in FIG. 9.

The signal converter 14C receives the demodulation-resultant signal from the demodulator 13 which agrees with a PE-RZ signal containing a scrambled version of copyright information. The signal converter 14C decodes the PE-RZ signal, and outputs the decoding-resultant signal to the copyright decoder 14B. The signal converter 14C is a PE-RZ signal demodulator.

The copyright decoder 14B subjects the output signal of the signal converter 14C to given processes such as a copyright decoding process and a de-scrambling process. Thereby, the copyright decoder 14B recovers the original copyright information. The copyright decoder 14B outputs the recovered copyright information to the CPU 18C.

Figure 17:
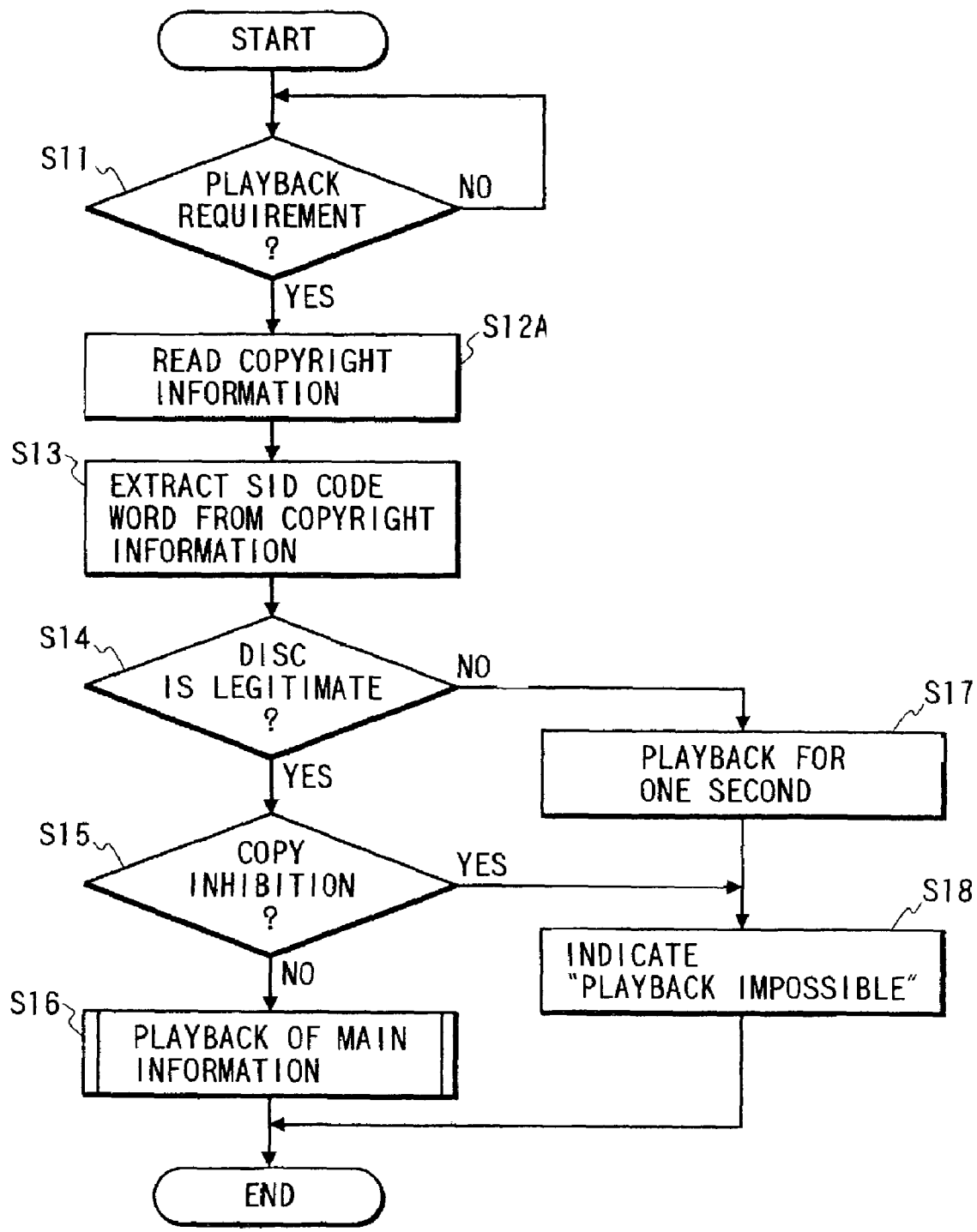
FIG. 17 is a flowchart of a segment of a control program for a CPU in FIG. 16.

FIG. 17 is a flowchart of a segment of a control program for the CPU 18C which is started when a disc 11A is set in position within the disc drive 12. The control program segment in FIG. 17 includes a step S12A instead of the step S12 in FIG. 10.

The step S12A controls the disc drive 12 so that the disc drive 12 will read out a recorded signal from a post cutting area of the disc 11A. The readout signal is converted into original copyright information (recovered copyright information) by the demodulator 13, the signal converter 14C, and the copyright decoder 14B. The step S12A fetches the recovered copyright information from the copyright decoder 14B.

Tenth Embodiment

Figure 18:
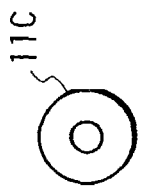
FIG. 18 is a diagram of a CD according to a tenth embodiment of this invention.

With reference to FIG. 18, a CD (compact disc) 11C has a TOC (table of contents) area which stores TOC information and also copyright information. The copyright information is similar to that in FIG. 4. The copyright information may be similar to that in FIG. 3. The CD 11C has a data area on which main information is recorded. The main information represents, for example, a musical program. The musical program may be replaced by a computer game program or a video program.

The CD 11C is one among a normal CD, an enhanced CD, and a CD-ROM.

Eleventh Embodiment

Figure 19:
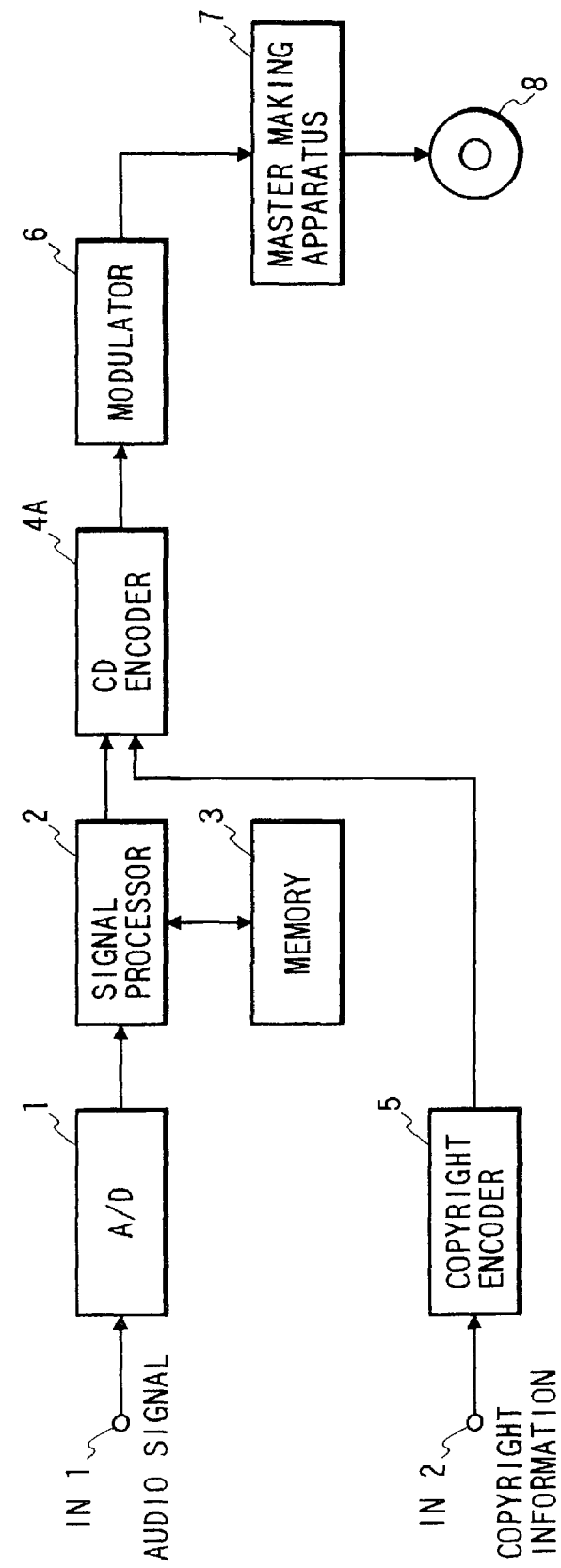
FIG. 19 is a block diagram of a signal processing apparatus according to an eleventh embodiment of this invention.

FIG. 19 shows an eleventh embodiment of this invention which is similar to the fourth embodiment (FIG. 5) thereof except for design changes indicated hereinafter. The embodiment of FIG. 19 includes a CD encoder 4A instead of the DVD encoder 4 in FIG. 5. The CD encoder 4A is one among a normal-CD encoder, an enhanced-CD encoder, and a CD-ROM encoder.

The CD encoder 4A formats or encodes the output signal of the signal processor 2 and the output signal of the copyright encoder 5 so that the scrambled version of copyright information will be located in a disc TOC area, and that a digital audio signal representing a musical program will be located in a disc data area. The CD encoder 4A outputs the encoding-resultant signal to the modulator 6.

Figure 20:
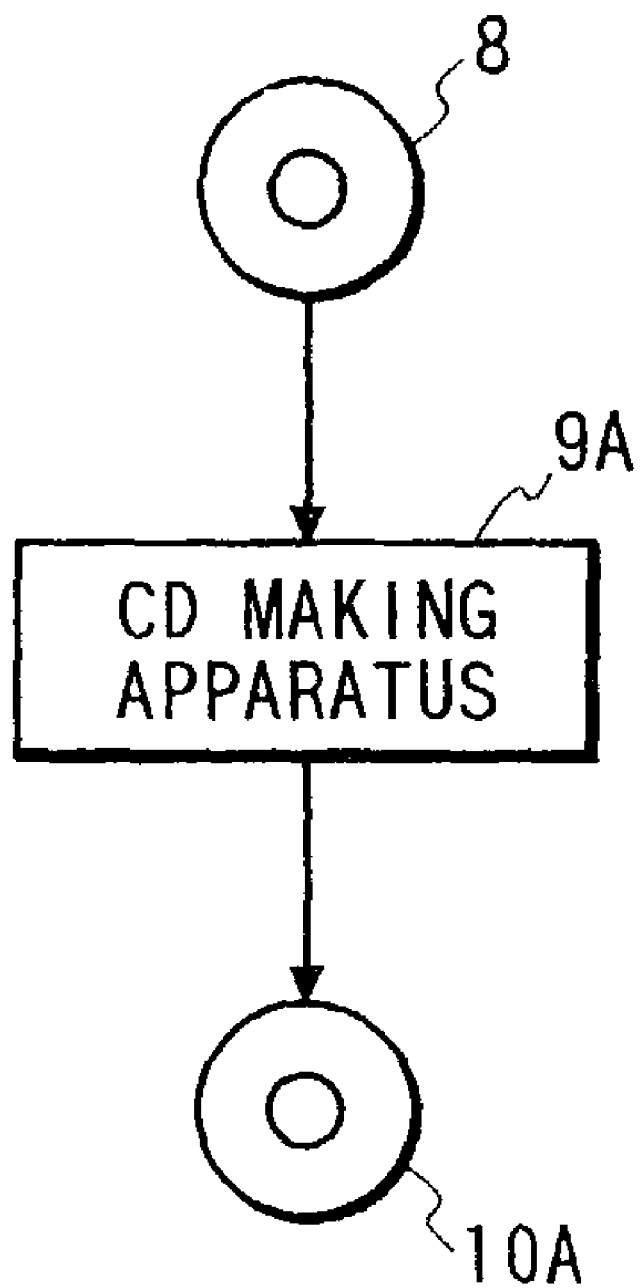
FIG. 20 is a block diagram of a master disc, a CD making apparatus, and a CD in the eleventh embodiment of this invention.

As shown in FIG. 20, the master disc 8 is set in a CD making apparatus 9A. The apparatus 9A makes CD's 10A on the basis of the master disc 8. In each of the CD's 10A, the scrambled version of the copyright information is recorded on a TOC area in accordance with the tenth embodiment.

Twelfth Embodiment

Figure 21:
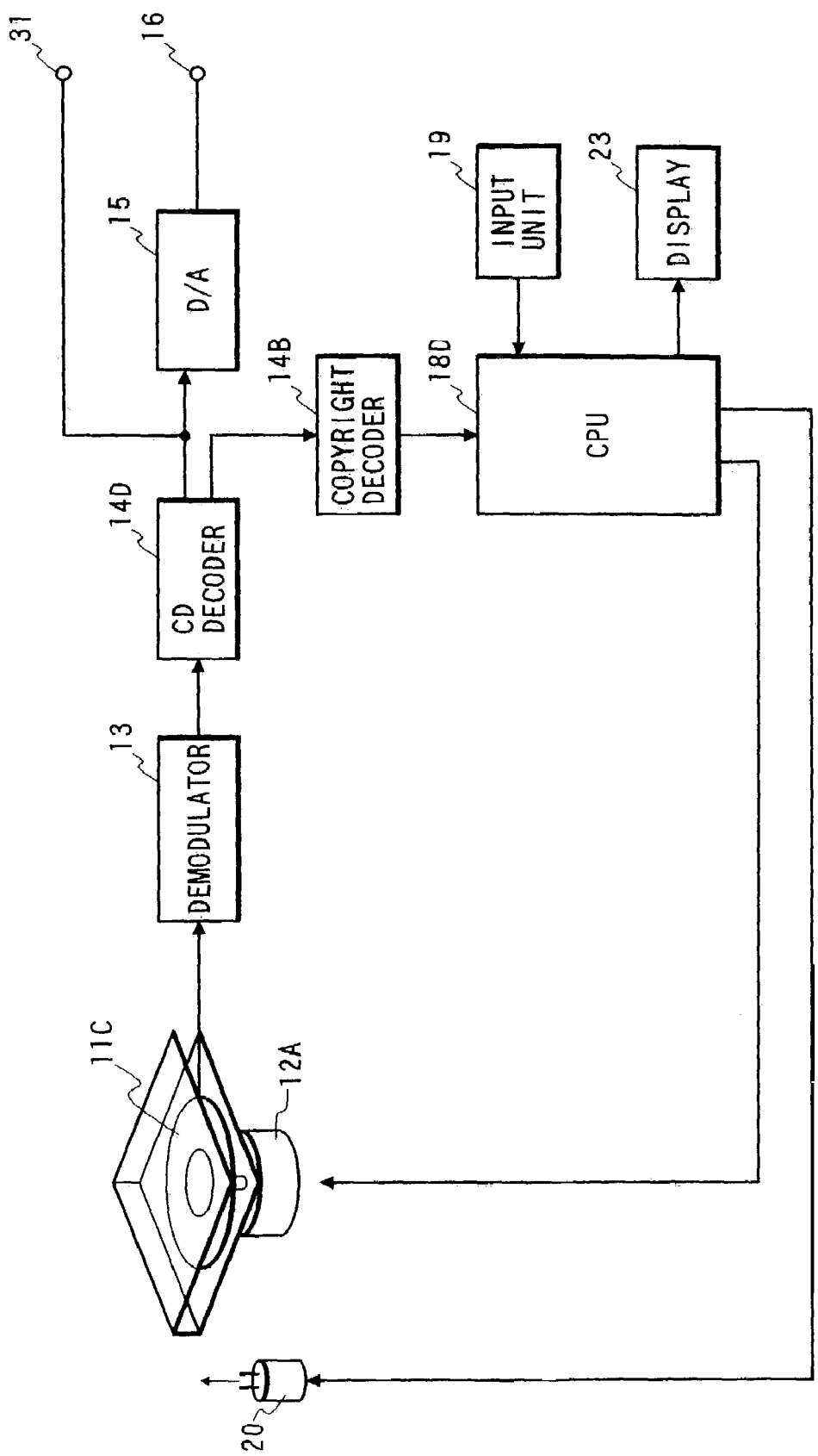
FIG. 21 is a block diagram of a disc player according to a twelfth embodiment of this invention.

FIG. 21 shows a twelfth embodiment of this invention which is similar to the fifth embodiment (FIGS. 7 and 8) except for design changes indicated hereinafter. The embodiment of FIG. 21 includes a disc drive 12A instead of the disc drive 12 in FIG. 7. The disc drive 12A is designed to operate on a CD 11C in the tenth embodiment (FIG. 18). The embodiment of FIG. 21 includes a CD decoder 14D instead of the DVD decoder 14A in FIG. 7. The embodiment of FIG. 21 includes a CPU 18D instead of the CPU 18 in FIG. 7. The CD decoder 14D is one among a normal-CD decoder, an enhanced-CD decoder, and a CD-ROM decoder.

The disc drive 12A serves to read out a recorded signal from the CD 11C placed therein. The disc drive 12A outputs the readout signal to the demodulator 13. The CD decoder 14D de-formats or decodes the output signal of the demodulator 13, and separates the output signal of the demodulator 13 into a digital audio signal of a musical program and a scrambled version of copyright information. The CD decoder 14D outputs the digital audio signal to the D/A converter 15. The CD decoder 14D may feed the digital audio signal to an external apparatus such as a personal computer via an output terminal 31.

The CD decoder 14D outputs the scrambled version of the copyright information to the copyright decoder 14B. The copyright decoder 14B subjects the output signal of the CD decoder 14D to given processes such as a copyright decoding process and a de-scrambling process. Thereby, the copyright decoder 14B recovers the original copyright information. The copyright decoder 14B outputs the recovered copyright information to the CPU 18D.

Figure 22:
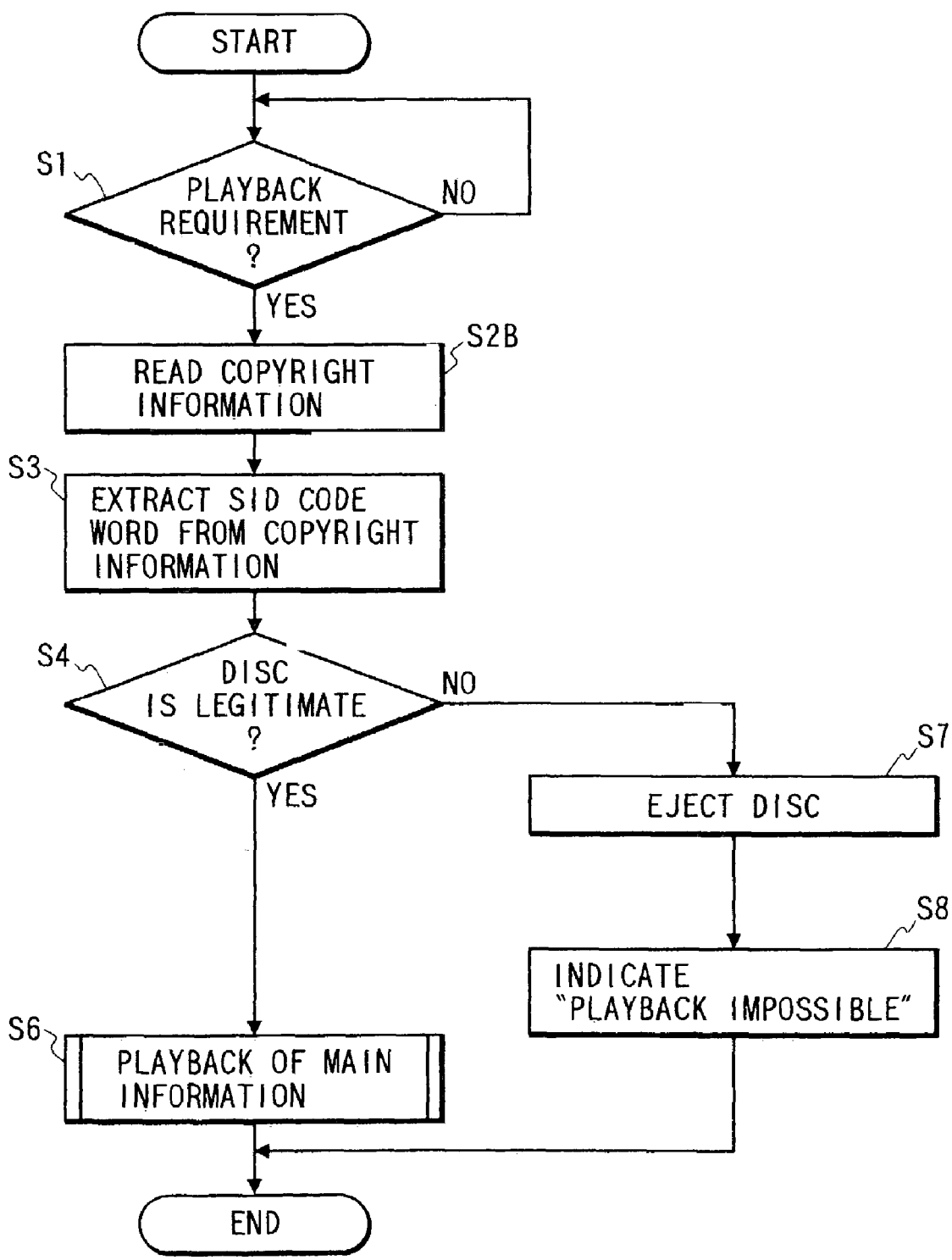
FIG. 22 is a flowchart of a segment of a control program for a CPU in FIG. 21.

FIG. 22 is a flowchart of a segment of a control program for the CPU 18D which is started when a CD 11C is set in position within the disc drive 12A. As shown in FIG. 22, a first step S1 of the control program decides whether or not a playback start requirement is inputted via the input unit 19. When the playback start requirement is inputted, the program advances from the step S1 to a step S2B. Otherwise, the step S1 is repeated.

The step S2B controls the disc drive 12A so that the disc drive 12A will read out a recorded signal from a TOC area of the CD 11C. The readout signal is converted into original copyright information (recovered copyright information) by the demodulator 13, the CD decoder 14D, and the copyright decoder 14B. The step S2A fetches the recovered copyright information from the copyright decoder 14B.

A step S3 following the step S2B extracts a SID code word (a recovered SID code word) from the recovered copyright information.

A step S4 subsequent to the step S3 collates the recovered SID code word with reference SID code words to decide whether the CD 11C is legitimate or pirated. When the recovered SID code word agrees with one of the reference SID code words, that is, when the CD 11C is decided to be legitimate, the program advances from the step S4 to a block S6. When the recovered SID code word agrees with none of the reference SID code words, that is, when the CD 11C is decided to be pirated, the program advances from the step S4 to a step S7.

The block S6 controls the disc drive 12A so that the disc drive 12A will read out a recorded signal from a data area of the CD 11C. The readout signal is converted into an analog audio signal (a recovered analog audio signal) by the demodulator 13, the CD decoder 14D, and the D/A converter 15. The recovered analog audio signal which represents a musical program is transmitted from the D/A converter 15 to an audio apparatus via the output terminal 16. In this way, the block S6 implements playback of the musical program. After the block S6, the current execution cycle of the control program segment ends.

The step S7 suspends operation of the disc drive 12A. Then, the step S7 activates the disc ejecting mechanism 20 to eject the CD 11C from the disc drive 12A. After the step S7, the program advances to a step S8.

The step S8 controls the display 23 so that "playback impossible" will be indicated thereon. After the step S8, the current execution cycle of the control program segment ends.

Thirteenth Embodiment

Figure 23:
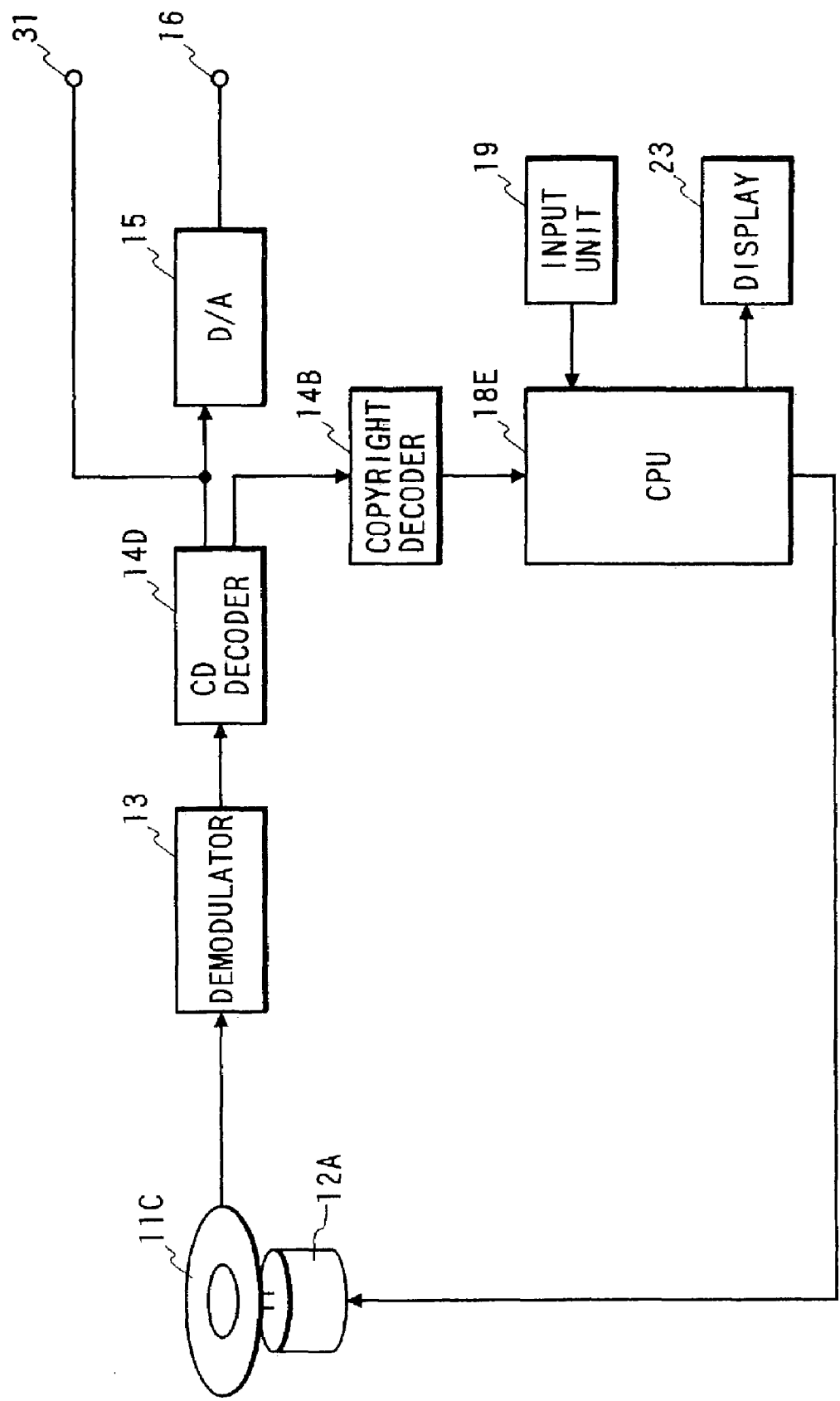
FIG. 23 is a block diagram of a disc player according to a thirteenth embodiment of this invention.

FIG. 23 shows a thirteenth embodiment of this invention which is similar to the sixth embodiment (FIGS. 9 and 10) except for design changes indicated hereinafter. The embodiment of FIG. 23 includes a disc drive 12A instead of the disc drive 12 in FIG. 9. The disc drive 12A is designed to operate on a CD 11C in the tenth embodiment (FIG. 18). The embodiment of FIG. 23 includes a CD decoder 14D instead of the DVD decoder 14A in FIG. 9. The embodiment of FIG. 23 includes a CPU 18E instead of the CPU 18A in FIG. 9. The CD decoder 14D is one among a normal-CD decoder, an-enhanced-CD decoder, and a CD-ROM decoder.

The disc drive 12A serves to read out a recorded signal from the CD 11C placed therein. The disc drive 12A outputs the readout signal to the demodulator 13. The CD decoder 14D de-formats or decodes the output signal of the demodulator 13, and separates the output signal of the demodulator 13 into a digital audio signal of a musical program and a scrambled version of copyright information. The CD decoder 14D outputs the digital audio signal to the D/A converter 15. The CD decoder 14D may feed the digital audio signal to an external apparatus such as a personal computer via an output terminal 31.

The CD decoder 14D outputs the scrambled version of the copyright information to the copyright decoder 14B. The copyright decoder 14B subjects the output signal of the CD decoder 14D to given processes such as a copyright decoding process and a de-scrambling process. Thereby, the copyright decoder 14B recovers the original copyright information. The copyright decoder 14B outputs the recovered copyright information to the CPU 18E.

Figure 24:
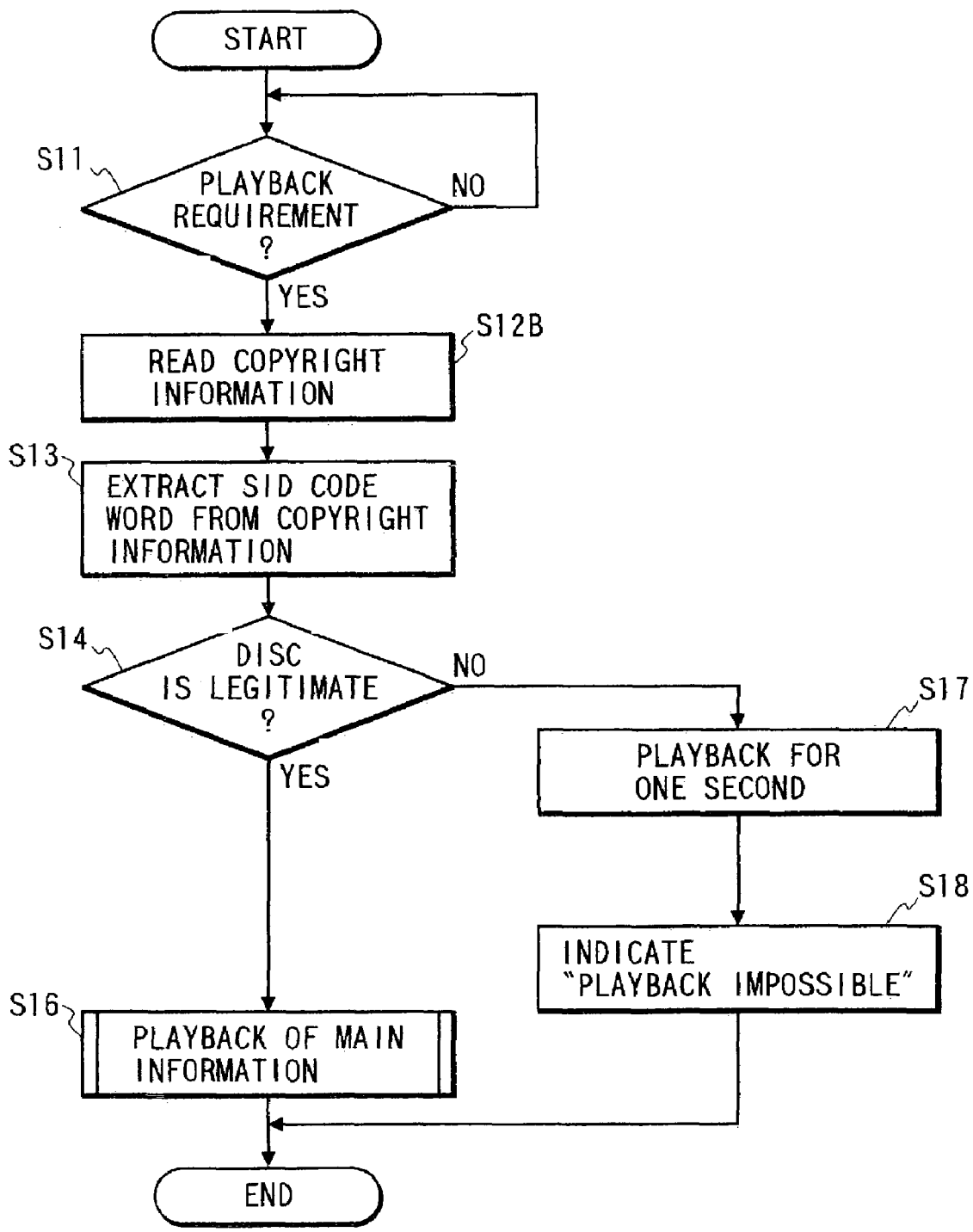
FIG. 24 is a flowchart of a segment of a control program for a CPU in FIG. 23.

FIG. 24 is a flowchart of a segment of a control program for the CPU 18E which is started when a CD 11C is set in position within the disc drive 12A. As shown in FIG. 24, a first step S11 of the control program decides whether or not a playback start requirement is inputted via the input unit 19. When the playback start requirement is inputted, the program advances from the step S11 to a step S12B. Otherwise, the step S1 is repeated.

The step S12B controls the disc drive 12A so that the disc drive 12A will read out a recorded signal from a TOC area of the CD 11C. The readout signal is converted into original copyright information (recovered copyright information) by the demodulator 13, the CD decoder 14D, and the copyright decoder 14B. The step S12B fetches the recovered copyright information from the copyright decoder 14B.

A step S13 following the step S12B extracts a SID code word (a recovered SID code word) from the recovered copyright information.

A step S14 subsequent to the step S13 collates the recovered SID code word with reference SID code words to decide whether the CD 11C is legitimate or pirated. When the recovered SID code word agrees with one of the reference SID code words, that is, when the CD 11C is decided to be legitimate, the program advances from the step S14 to a block S16. When the recovered SID code word agrees with none of the reference SID code words, that is, when the CD 11C is decided to be pirated, the program advances from the step S14 to a block S17.

The block S16 controls the disc drive 12A so that the disc drive 12A will read out a recorded signal from a data area of the CD 11C. The readout signal is converted into an analog audio signal (a recovered analog audio signal) by the demodulator 13, the CD decoder 14D, and the D/A converter 15. The recovered analog audio signal which represents a musical program is transmitted from the D/A converter 15 to an audio apparatus via the output terminal 16. In this way, the block S16 implements playback of the musical program. After the block S16, the current execution cycle of the control program segment ends.

The block S17 controls the disc drive 12A so that the disc drive 12A will read out the recorded signal from the data area of the CD 11C only during a given limited time. The given limited time is equal to, for example, about 1 second. The readout signal is converted into an analog audio signal (a recovered analog audio signal) by the demodulator 13, the CD decoder 14D, and the D/A converter 15. The recovered analog audio signal which represents a limited portion of the musical program is transmitted from the D/A converter 15 to the audio apparatus via the output terminal 16. In this way, the block S17 implements playback of the limited portion of the musical program. In other words, the block S17 implements playback of the musical program during only the limited time (for example, about 1 second). The playback of the musical program for the limited time is to inform the user that the CD 11C is not defective. Then, the block S17 suspends operation of the disc drive 12A. After the block S17, the program advances to a step S18.

The step S18 controls the display 23 so that "playback impossible" will be indicated thereon. After the step S18, the current execution cycle of the control program segment ends.

What is claimed is:

1. A digital signal recording disc comprising:
   a post cutting area, a lead-in area, and a data area,
   the data area storing main information,
   the lead-in area including a control area having sectors for recording copyright information which contains an internationally-registered SID code word and a word of a copy inhibition code, the SID code word representing a disc producer,
   wherein the SID code word is collated with internationally-registered reference SID code words by a reproducing apparatus to be referred to when the main information is played back by the reproducing apparatus,
   wherein the word of the copy inhibition code is recovered by the reproducing apparatus, and a decision about whether or not the recovered word of the copy inhibition code indicates copy inhibition is performed by the reproducing apparatus,
   wherein the SID code word is referred to before the main information is played back by the reproducing apparatus, and
   wherein the control area includes a RAM area for recording at least the SID code word.

2. A method of reproducing information from a digital signal recording disc having a post cutting area, a lead-in area, and a data area, the data area storing main information, the lead-in area including a control area having sectors for recording copyright information which contains an internationally-registered SID code word and a word of a copy inhibition code, the SID code word representing a producer of the disc, wherein the control area includes a RAM area for recording at least the SID code word, the method comprising the steps of:
   reading out a SID code word from the lead-in area of the disc;
   collating the readout SID code word with internationally-registered reference SID code words which represent disc producers respectively to be referred to when the main information is played back by a reproducing apparatus;

reading out a word of a copy inhibition code from the lead-in area of the disc;

deciding whether or not the readout word of the copy inhibition code indicates copy inhibition; referring to the readout SID code word before playback of the main information is performed from the data area of the disc;

playing back the main information; and inhibiting copying the main information when the word of copy inhibition code indicates copy inhibition.

3. A method of recording information to and reproducing information from a digital signal recording disc having a post cutting area, a lead-in area, and a data area, the data area storing main information, the lead-in area including a control area having sectors for recording copyright information which contains an internationally-registered SID code word and a word of a copy inhibition code, the SID code word representing a producer of the disc, wherein the control area includes a RAM area for recording at least the SID code word, the method comprising the steps of:

recording a SID code word to the RAM area in the control area, wherein the SID code word with internationally-registered reference SID code words which represent disc producers respectively to be referred to when the main information is reproduced by a reproducing apparatus;

reading out a SID code word from the lead-in area of the disc;

referring to the readout SID code word for reproducing the main information from the data area of the disc; and playing back the main information.

* * * * *

UNITED STATES PATENT AND TRADEMARK OFFICE
CERTIFICATE OF CORRECTION

PATENT NO. : 7,408,859 B2
APPLICATION NO. : 10/637596
DATED : August 5, 2008
INVENTOR(S) : Yoshiaki Tanaka et al.

It is certified that error appears in the above-identified patent and that said Letters Patent is hereby corrected as shown below:

On the Title page of the Patent:

Under the Title Item "(*) Notice", the following sentence was omitted: "This patent is subject to a terminal disclaimer."

Signed and Sealed this

Thirtieth Day of December, 2008

JON W. DUDAS
*Director of the United States Patent and Trademark Office*